(12) United States Patent
Cho

(10) Patent No.: US 11,477,714 B2
(45) Date of Patent: Oct. 18, 2022

(54) MOBILITY SUPPORTING METHOD WITH WIRELESS INTERNET NETWORKS AND MOBILITY SUPPORT SERVER

(71) Applicant: Korea Advanced Institute of Science and Technology, Daejeon (KR)

(72) Inventor: Dong Ho Cho, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/379,443

(22) Filed: Jul. 19, 2021

(65) Prior Publication Data

US 2022/0060958 A1  Feb. 24, 2022

(30) Foreign Application Priority Data

Aug. 24, 2020  (KR) .................. 10-2020-0105963
Oct. 14, 2020  (KR) .................. 10-2020-0132513

(51) Int. Cl.
| | | |
|---|---|---|
| *H04W 4/00* | (2018.01) | |
| *H04W 36/26* | (2009.01) | |
| *H04W 36/14* | (2009.01) | |
| *H04W 60/00* | (2009.01) | |
| *H04W 8/12* | (2009.01) | |

(52) U.S. Cl.
CPC ............. *H04W 36/26* (2013.01); *H04W 8/12* (2013.01); *H04W 36/14* (2013.01); *H04W 60/00* (2013.01)

(58) Field of Classification Search
CPC ....... H04W 36/24; H04W 8/12; H04W 36/14; H04W 60/00
See application file for complete search history.

(56) References Cited

FOREIGN PATENT DOCUMENTS

| KR | 10-2009-0113658 A | 11/2009 |
|---|---|---|
| KR | 10-2016-0149751 A | 12/2016 |

*Primary Examiner* — Justin Y Lee
(74) *Attorney, Agent, or Firm* — Paratus Law Group, PLLC

(57) ABSTRACT

Disclosed is a method of supporting wireless Internet mobility including receiving, by a mobility support server, at least one service condition selected from a service condition group consisting of mobility support target information, network information, service quality information, ubiquitous thing information, communication mode information, and access node terminal information to provide an Internet service to a mobility support target, registering, by the mobility support server, support information for the mobility support target according to the at least one service condition, providing, by the mobility support server, an Internet service for the mobility support target on the basis of the at least one service condition, and supporting, by the mobility support server, mobility for the mobility support target on the basis of the at least one service condition.

20 Claims, 12 Drawing Sheets

MOBILITY SUPPORTING METHOD WITH WIRELESS INTERNET NETWORKS AND MOBILITY SUPPORT SERVER

CROSS-REFERENCE TO RELATED APPLICATIONS

This application claims under 35 U.S.C. § 119(a) to Korean Patent Application Nos. 10-2020-0105963 (filed on Aug. 24, 2020), and 10-2020-0132513 (filed on Oct. 14, 2020), which are all hereby incorporated by reference in their entirety.

BACKGROUND

The following description relates to a method of providing seamless wireless Internet for an object moving indoors and outdoors.

Wireless communication systems may provide Internet services to user terminals based on a plurality of access networks. Mobile communication systems may provide Internet services to user terminals through the long-term evolution (LTE) of the 3rd Generation Partnership Project (3GPP). Also, wireless network systems that are not based on the 3GPP may also provide Internet services to user terminals. A typical non-3GPP-based wireless network system is a wireless local area network (WLAN). Also, a 5G mobile communication network of the 3GPP has a reinforced protocol that supports machine-to-machine communication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is a method of supporting wireless Internet mobility, the method including receiving, by a mobility support server, at least one service condition selected from a service condition group including mobility support target information, network information, service quality information, ubiquitous thing information, communication mode information, and access node terminal information to provide an Internet service to a mobility support target, registering, by the mobility support server, support information for the mobility support target according to the at least one service condition, providing, by the mobility support server, an Internet service for the mobility support target on the basis of the at least one service condition, and supporting, by the mobility support server, mobility for the mobility support target on the basis of the at least one service condition.

The network information includes at least one network type selected from a network type group including an indoor wireless Internet network, an indoor wireless IoT network, an outdoor wireless Internet network, and an outdoor wireless IoT network.

In another aspect, there is a wireless Internet-based mobility support server including a storage device configured to store at least one list selected from a list group including a list of available networks, a list of service qualities, a list of ubiquitous things, a list of communication modes, a list of access node terminals, and a list of mobility support targets, a communication device configured to receive at least one service condition selected from a service condition group including network information, service quality information, access node terminal information, ubiquitous thing information, communication mode information, and mobility support target information, and a computing device configured to perform control to decide an available network or ubiquitous thing for the mobility support target according to the at least one service condition and provide a network service to the mobility support target through the decided network or ubiquitous thing when wireless network movement occurs after initial network access.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
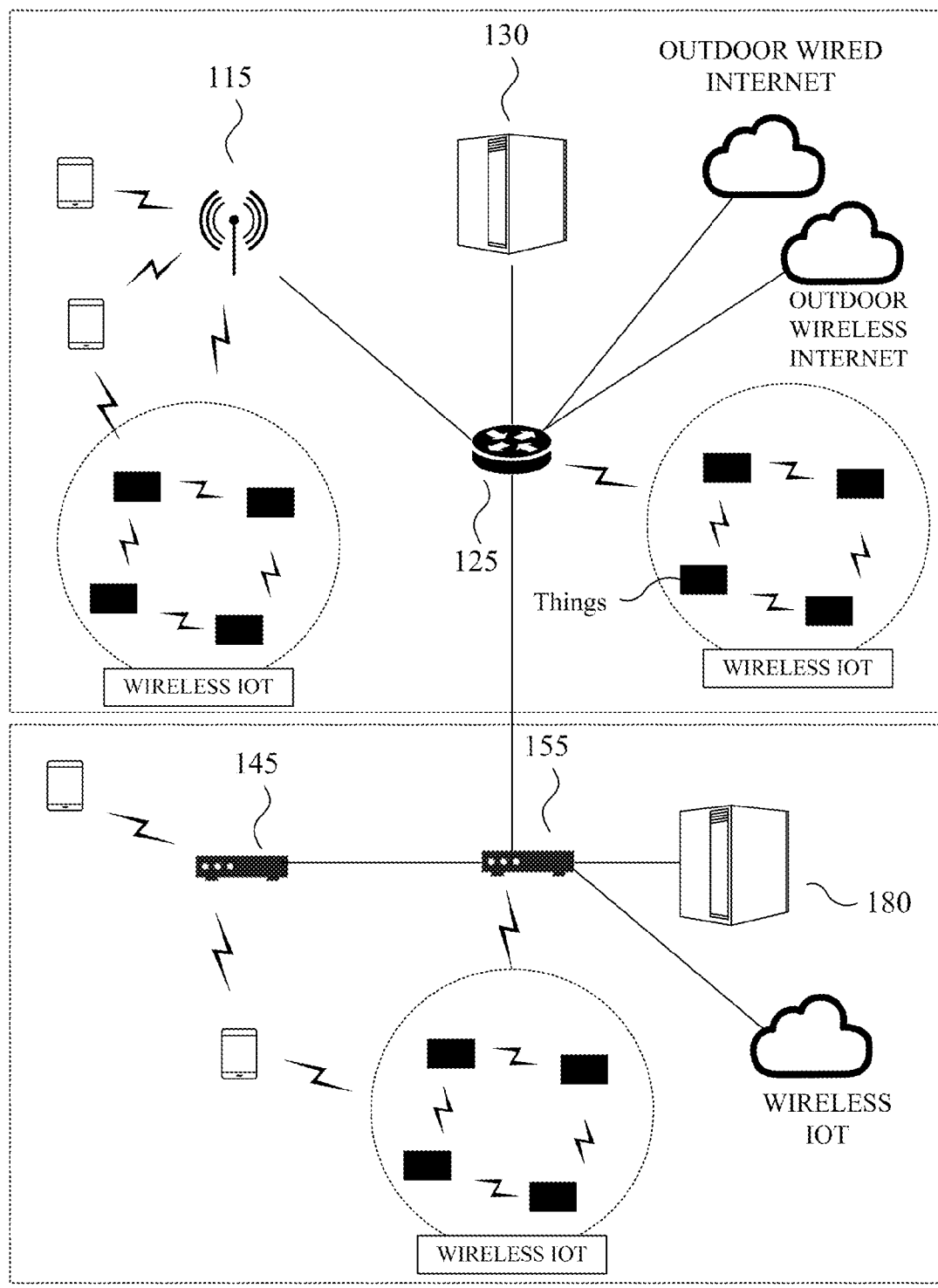
FIG. 1 illustrates an example of an indoor/outdoor Internet network system.

As the following description may be variously modified and have several example embodiments, specific embodiments will be shown in the accompanying drawings and described in detail below. It should be understood, however, that there is no intent to limit the following description to the particular forms disclosed, but on the contrary, the following description is to cover all modifications, equivalents, and alternatives falling within the spirit and scope of the invention.

In addition, the terms such as "first," "second," "A," and "B" may be used to describe various elements, but these elements are not limited by these terms. These terms are used to only distinguish one element from another element. For example, a first element may be called a second element, and a second element may also be called a first element without departing from the scope of the following description. The term "and/or" means any one or a combination of a plurality of related items.

It should be understood that singular forms are intended to include plural forms unless the context clearly indicates otherwise, and it should be further understood that the terms "comprise," "include," or "have" as used herein specify the presence of stated features, numerals, steps, operations, elements, components, or a combination thereof but do not preclude the presence or addition of one or more other features, numerals, steps, operations, elements, components, or combinations thereof.

Prior to a detailed description of the drawings, it should be clarified that division of components in the present specification is performed merely based on main functions performed by the respective components. That is, two or more components which will be described later may be integrated into a single component or, alternatively, a single component may be divided into two or more components depending on subdivided functions. Further, it is apparent that each of the components, which will be described later, may additionally perform some or all of the functions performed by other components in addition to main functions performed thereby, and some of the main functions performed by the respective components may be shared with other components and may be performed.

In addition, the respective steps of the above method may be performed in a sequence different from a described sequence unless the context clearly defines a specific sequence. That is, the respective steps may be performed in the same order as described, substantially simultaneously, or in reverse order.

First, terms used herein will be described below. Terms that are not defined below are interpreted as meanings that are commonly used in the relevant technical field.

The following description relates to a technique for providing a certain network service to a thing or a user terminal (user equipment) by using the Internet. Mobile Internet may use methods such as IPv4, IPv6, mobile IP, Session Initiation Protocol (SIP), and Service Location Protocol (SLP). The following description is not limited to the type of protocol for providing the Internet.

Things include various objects that connect through the Internet of Things (IoT). For example, there are various types of objects such as bands, wearable devices, earphones, various sensors, smart devices, lighting devices, industrial equipment, monitoring equipment, and automobiles. The IoT may be a 3GPP-based mobile communication, a low-power wide-area network (LPWAN), or a local area network (LAN)-based network. LoRA WAN is representative of the LPWAN. Wi-Fi, Bluetooth, and the like are representative of the LAN. Also, the IoT may use the Constrained Application Protocol (CoAP) and the Message Queue Telemetry Transport (MQTT) message protocols of the Internet Engineering Task Force (IETF). The following description is not limited to a communication method or a protocol type that is used for the IoT. Hereinafter, the wired IoT or the wireless IoT refers to a network that provides network services to objects indoors or outdoors.

Things are subject to receiving mobility support. For example, things are devices that are portable or wearable by people (bands, earphones, etc.). Furthermore, things may include a device placed in a moving object (e.g., a vehicle's sensor, a vehicle's communication module, a robot's sensor, etc.). Therefore, a thing may be referred to as a moving object.

Basically, a user terminal refers to a device that a user possesses. User terminals include smartphones, notebook computers, smart devices, wireless microphones, wireless earphones, wireless headsets, virtual reality devices, augmented reality devices, hologram output devices, voice recognition devices, gesture recognition devices, or input/output (I/O) devices, etc. That is, a user terminal refers to various devices that have a communication function and that are carried or worn by users. A user may use at least one user terminal through the Internet.

An I/O device refers to a simple device that is capable of connecting through a communication network. It is difficult for I/O devices to perform heavy computations. Therefore, I/O devices may perform processing by distributing computations to various ubiquitous computing devices (ubiquitous things) connected to a network. It will be appreciated that not only I/O devices but also other user terminals may perform processing by distributing computations to various ubiquitous computing devices connected to a network. User terminals may receive stable Internet services using inexpensive equipment by utilizing so-called edge computing technology.

Furthermore, a user terminal may be a device that a user does not possess. For example, a user terminal may be a specific device (an on-site device) placed indoors or outdoors. Here, a specific device includes a user interface (keyboard, touch, voice, gesture input, etc.) and an output device (display, sound, etc.). An on-site device may be connected to the Internet to provide a specific service to a user who is using the on-site device. For example, an on-site device may provide various services such as a navigation server, a search service, a call service, and an advertisement output. When a plurality of on-site devices are disposed in separate places, a user may receive a specific seamless service using a plurality of specific devices. Alternatively, an on-site device may receive a specific service while moving with a movable device (a robot, etc.).

Furthermore, a user terminal may be a vehicle, a communication device installed in a vehicle, etc. Therefore, a user terminal is defined as a device that a user possesses or that provides a certain service to a user even if the user does not possess the device.

Herein, a user terminal and a user may be used in the same sense. In some embodiments, however, when a user's location is detected by means other than a user terminal, the user and the user's user terminal may refer to different objects. For example, when the user's location can be detected by a camera or a separate location tracking device, the user and the user terminal are distinct objects.

The user terminal or the user is subject to receiving mobility support. A user terminal refers to a specific device for which mobility is supported according to a user's movement. A user refers to a person who receives mobility support through his or her own at least one thing, at least one user terminal, or at least one on-site device placed in a specific area according to the user's movement.

An object subject to mobility support or a mobility support target is subject to mobility support. The mobility support target includes at least one selected from the target group including a thing, a user, and a user terminal.

Meanwhile, a thing or a user terminal may process certain computations in cooperation with another device that is ubiquitous around the current location. A thing or a user terminal may receive a specific data service using another device that is ubiquitous around the thing or the user terminal (edge computing). In this case, the device that is ubiquitous around the thing or the user terminal is called a ubiquitous computing device or a ubiquitous thing. A ubiquitous thing is a device that transmits or receives data and performs certain computations by including a communication module and a computation module. Ubiquitous things include personal smart devices, personal things, things placed on roads (a road side unit (RSU); a display device, a sensor device, etc.), devices that make up a communication network (routers, gateways, access points (APs), etc.), and the like.

An indoor wireless Internet network provides Internet access and services to a thing or a user terminal indoors. WLAN (Wi-Fi) is representative of the indoor wireless Internet network. Furthermore, an indoor wireless Internet network may be composed of a gateway and a short-range wireless communication node such as Bluetooth or Zigbee. The following description is not limited to the type of protocol for providing the indoor wireless Internet network.

Here, the term "indoor" does not necessarily mean the inside of a building. An indoor place may be understood as the concept of a place (a specific institution, a school campus, a corporate campus, etc.) that provides a network in a limited area.

Furthermore, an indoor network may mean a moving place rather than a fixed area or place. For example, an indoor network may mean a network inside a device such as a moving vehicle, ship, train, or aircraft. Therefore, an indoor network may include a fixed indoor network, an indoor network of a land transportation vehicle (a train, a bus, etc.), an indoor network of a marine vessel, an indoor network of an aerial vehicle, an indoor network of a spacecraft, and the like.

Various network systems are applicable to an outdoor wireless Internet network. A 3GPP-based mobile communication network (3G, 4G, 5G, etc.) is representative of the outdoor wireless Internet network.

Here, the term "outdoor" does not necessarily mean the outside of a building. An outdoor place may be understood as the concept of a place that provides a network in a wide area. An outdoor network may include a land mobile network, a maritime mobile network, an air mobile network, a space mobile network, etc.

Wireless Internet networks all have limited service coverage according to communication methods. Therefore, when a thing or a user terminal moves out of a corresponding area, the thing or the user terminal may be connected to a network other than the current unit network. Handover generally refers to a technology for, when a subscriber moves out of a service coverage and moves to another network or another cell, changing a communication network and a channel so that a service is maintained in another cell. Roaming generally refers to support for movement between networks of the same operator or movement between networks of different operators. In the following description, movement or mobility is used in the sense of including a thing or a user terminal that moves to cause Internet network movement between networks of the same operator or between networks of different operators. That is, mobility is meant to include both handover and roaming.

As described above, a wireless Internet network may be a network based on various communication methods or protocols. Therefore, the term "mobility" described herein includes mobility between homogeneous networks or between heterogeneous networks.

FIG. 1 is an example showing a configuration of an indoor/outdoor Internet network system 100. In FIG. 1, the upper square block shows an outdoor internet network system, and the lower square block shows an indoor internet network system.

FIG. 1 shows a system that supports integrated control and mobility for indoor and outdoor Internet networks through a mobility support server. A mobility support server 130 supports mobility for an outdoor network. A mobility support server 180 supports mobility for an indoor network. FIG. 1 shows a server for controlling an outdoor network and a server for controlling an indoor network. That is, as shown in FIG. 1, the mobility support servers 130 and 180 may support mobility for the indoor network and the outdoor network, respectively. Furthermore, one mobility support server may support mobility for indoor and outdoor networks in an integrated manner.

When a plurality of mobility support servers control an indoor network and/or an outdoor network, the plurality of mobility support servers may cooperatively support mobility by exchanging necessary information with each other. For example, as shown in FIG. 1, when the mobility support server 130 supports the outdoor network and the mobility support server 180 supports the indoor network, the mobility support server 130 and the mobility support server 180 may cooperatively support movement from an outdoor place to an indoor place or movement from an indoor place to an outdoor place. That is, the mobility support server 130 and the mobility support server 180 may transmit necessary information to each other and request a necessary operation in order to support mobility.

Also, mobility support servers may be placed in a certain unit of a building or an area. Therefore, a plurality of mobility support servers may be placed indoors and/or outdoors. In this case, the plurality of mobility support servers may cooperate with each other even for indoor or outdoor movement.

Furthermore, mobility support servers may be arranged on a per-network-type basis. For example, mobility support servers may be placed for each indoor wireless IoT network, outdoor wireless IoT network, indoor Internet network, or outdoor Internet network.

Also, a plurality of servers may be used as the mobility support server depending on a service or a mobility support target. For example, there may be a thing mobility support server that supports mobility for a thing, a user or user terminal mobility support server that supports mobility for a user or a user terminal, and a service quality mobility support server that supports service quality-based mobility.

The mobility support server may be a device that is managed by a communication service provider. For example, the mobility support server may include an object (e.g., a mobility management entity (MEE)) that controls mobility in a core network of a mobile communication network.

The mobility support server may operate with other objects. For example, the mobility support server may extract necessary information from other objects (database, Home Location Register, Visitor Location Register, Home Agent, Foreign Agent, SIP Home Register, SIP Foreign Register, etc.) that manage information on the user terminal and may support mobility using the extracted information.

An outdoor router 125 is connected to an outdoor wired Internet network or an outdoor wireless Internet network. The outdoor router 125 may be a gateway of a wired or wireless core network or an object connected to a corresponding gateway. The outdoor router 125 may provide the Internet to other objects in a wired or wireless manner.

The mobility support server 130 checks the connection state, service state, location, and mobility state of a mobility support target through the outdoor router 125 and supports mobility for the user, service quality, and mobility support target.

The outdoor router 125 may be connected to wireless IoT in a wired or wireless manner. The wireless IoT may use an individual communication protocol or the same protocol as the outdoor wireless Internet network. When the wireless IoT uses the individual communication protocol, the outdoor router 125 may be connected to a gateway of the wireless IoT although not shown in FIG. 1. FIG. 1 shows a form in which things constituting wireless IoT are connected to each other in a wireless manner, but at least some of the things constituting the IoT may be connected to each other in a wired manner. At least one of the things constituting the wireless IoT may be the above-described ubiquitous thing.

An access node 115 is connected to the outdoor router 125 to provide wireless Internet to an object in the coverage. The access node 115 may be a base station, a WiFi AP, etc. The access node 115 may provide wireless Internet to user terminals, things, etc. Also, the access node 115 may provide a network to the wireless IoT.

As described above, outdoor networks may be roughly classified into a wireless IoT network, a mobile communication-based wireless Internet network, or a wired communication-based wireless Internet network.

The indoor router 155 may be connected to an indoor wired Internet network. The indoor router 155 connected to the indoor wired Internet network may provide the Internet to other objects in a wired or wireless manner.

The indoor router 155 may be connected to wireless IoT in a wired or wireless manner.

The indoor router 155 and the outdoor router 125 may be connected to each other. Thus, necessary information may be transmitted between an indoor place and an outdoor place.

The mobility support server 180 checks the connection state, service state, location, and mobility state of a mobility support target through the indoor router 155 and supports mobility for the user, service quality, thing, or user terminal.

An indoor router 145 may be connected to the indoor router 155 in a wired or wireless manner. The indoor router 145 may be connected to a mobility support target in a wired or wireless manner. Also, the indoor router 145 may be connected to wireless IoT in a wired or wireless manner.

Even indoors, an access node may be connected to the indoor router 145 or 155. In this case, the access node may be connected to a thing, a user terminal, or a wireless IoT network.

As described above, indoor networks may be roughly classified into a wireless IoT network, a wired communication-based wireless Internet network, or a wireless communication-based wireless Internet network.

A process in which the mobility support server supports mobility for a user, a service quality, a thing, or a user terminal will be described below. Hereinafter, the mobility support server may be an integrated mobility support server for an indoor place and an outdoor place. When an indoor mobility support server and an outdoor mobility support server are separately provided, it is assumed that the indoor mobility support server and the outdoor mobility support server exchange necessary information with each other and controls upon movement between an indoor place and an outdoor place and controls mobility in their respective areas (the indoor place or the outdoor place).

Figure 2:
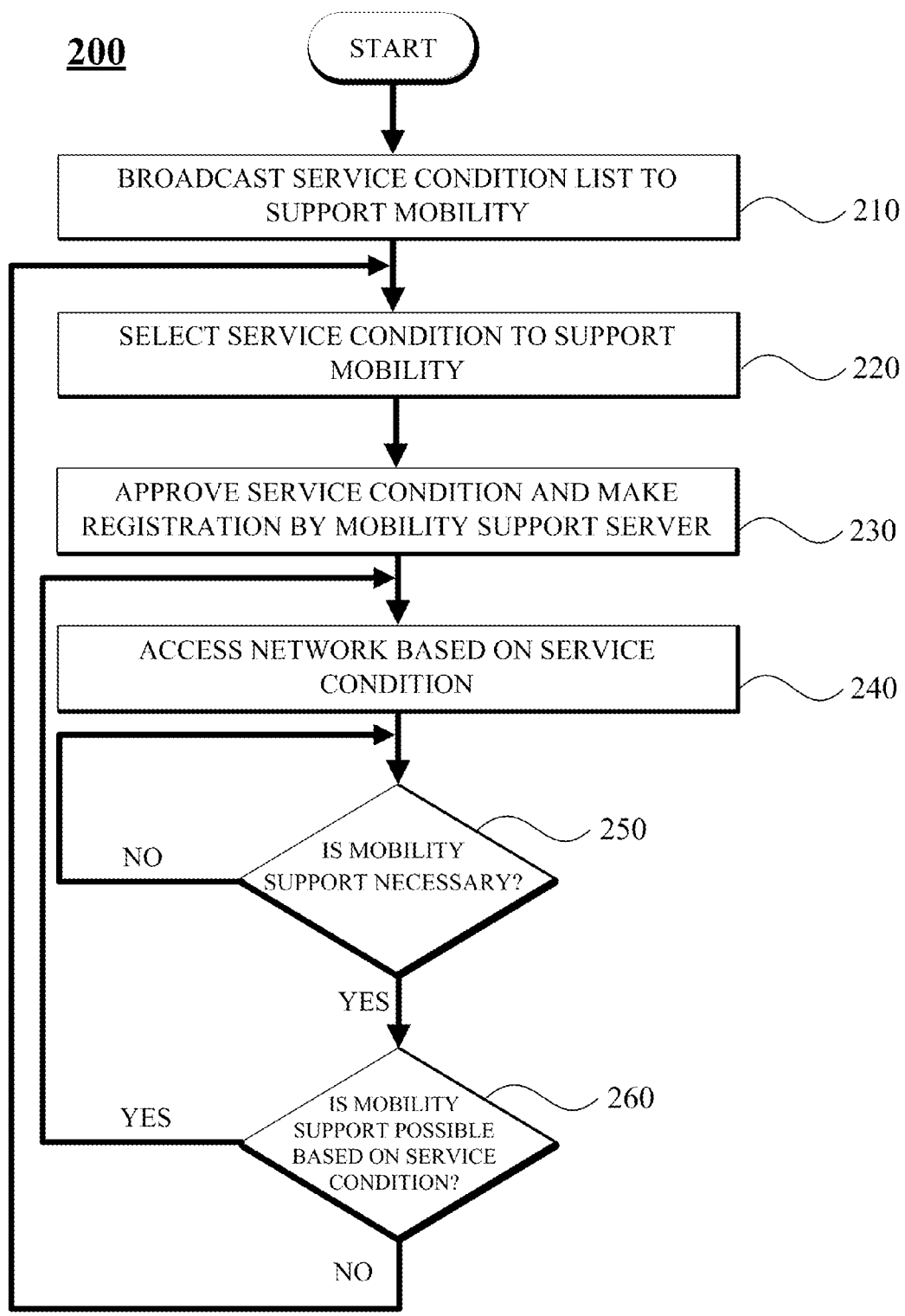
FIG. 2 illustrates an example of a mobility supporting process using an Internet network.

FIG. 2 is an example of a mobility supporting process 200 using an Internet network.

A mobility support server may provide information necessary for mobility support to a mobility support target in advance (210). A mobility support server may broadcast a service condition list for mobility support to a mobility support target (210). The service condition list may include a list of various service conditions. For example, the service condition list may include at least one of a list of available access node terminals, a list of service qualities, a list of ubiquitous things, a list of networks, and a list of communication modes.

The mobility support target may select a service condition for a mobility service to be used with reference to the service condition list. The service condition may be a specific condition or a combination of various conditions. Meanwhile, the service condition may be information that is automatically delivered even if the mobility support target separately enters the service condition. For example, a thing may store network information to be used for mobility or preferred network information and may deliver corresponding information to the mobility support server when the thing accesses a network.

The service condition is information that is a criterion or condition for mobility support. The service condition may include information on a mobility support target, a network type, a preferred network type, a service quality, a ubiquitous thing, a communication mode, and the like.

The mobility support server receives a service condition that is automatically delivered or that is selected by the mobility support target. The mobility support server may approve of the service condition and register the corresponding information (230).

The mobility support server may perform network access to the mobility support target on the basis of the registered service condition (240).

Subsequently, the mobility support server may determine whether the movement of the mobility support target is necessary (250). The mobility support server may receive a request for mobility support from the mobility support target. Mobility may be caused by such as a movement of the mobility support target, a network error, a change in quality of the network, and a change in availability of a ubiquitous thing.

When mobility support is not required (NO in 250), the mobility support server continues to provide network services to the mobility support target through the current network.

When mobility support is required (YES in 250), the mobility support server determines whether mobility support is possible according to a service condition registered in advance (S250).

When it is possible to move (YES in 250), the mobility support server accesses a new network that satisfies the service condition and provides network services.

When it is not possible to move (NO in 260), the mobility support server may select or receive a new service condition from the mobility support target and proceed with network access under the new service condition.

Service Condition

Service conditions that are criteria for mobility may be as follows.

(1) Network Information

Network information may include network types such as an indoor wireless IoT network, an indoor wireless Internet network, an outdoor wireless IoT network, and an outdoor wireless Internet network. A network type may be at least one of the indoor wireless IoT network, the indoor wireless Internet network, the outdoor wireless IoT network, and the outdoor wireless Internet network or one of all possible combinations thereof.

Furthermore, the network information may refer to information on a specific network or a plurality of networks among networks of the same type. For example, when wireless IoT is used for the movement of a thing, a user may select a wireless IoT network "A" and a wireless IoT network "B." In this case, the mobility support server may use only the wireless IoT network "A" and the wireless IoT network "B" among the wireless IoT networks to support mobility for a specific object.

The network information may include information on a network type and/or the identifier of a specific network.

The mobility support server may manage and provide a network list including the network information. The mobility support server may collect available network information provided by a specific network (a control element of the network). Alternatively, the mobility support server may serve to deliver available network information provided by the network to the mobility support target.

(2) Information of Public and Private Access Node Terminal

Public and private access node terminals are terminals that support access or mobility for a mobility support target.

The access node terminal may be a terminal that anyone or an authorized group may use for Internet access in public. The access node terminal may be a device such as a ubiquitous thing, a router, a gateway, a vehicle, an RSU, a robot, a communication module in a robot, and the like. The private access node terminal may be a thing or a user terminal that an individual possesses. In the following description, an access node terminal is used in the sense of including at least one of a access node terminal and a private access node terminal. The access node terminal may be connected to one of the above-described various networks and may serve to relay network access to a mobility support target.

The mobility support target may preset a specific access node terminal to be used for network access and mobility support. It will be appreciated that the mobility support target may set a plurality of access node terminals. Furthermore, the mobility support server may manage and provide a list of access node terminals. The mobility support server supports mobility for the mobility support target using the specific access node terminal.

Access node terminal information may include the type of an access node terminal and/or the identifier of an access node terminal indicating a specific device.

(3) Service Quality Information

Service quality refers to the quality of a signal transmitted or received by a mobility support target. The service quality may be evaluated using criteria such as data transfer rate, signal strength, error rate, loss rate, delay time, and blocking rate. The service quality may be classified as high quality, medium quality, or low quality according to a certain criterion. The mobility support target may preset the service quality of a network which the mobility support target has accessed or the service quality of a network to which the mobility support target is to move. The mobility support server may manage and provide a list of service qualities including the types or conditions of the service qualities. The mobility support server may collect or manage information on a service quality that may be provided from a specific network in advance. Alternatively, the mobility support server may deliver the information on the service quality provided by the specific network to the mobility support target. The mobility support server may support mobility to maintain a specific service quality. The service quality mobility is a service that supports mobility based on a service quality.

The service quality mobility may be classified depending on a service type. For example, the service may include (i) audiovisual services such as moving pictures, still images, audio, text, and graphics, (ii) tactile services, (iii) taste services, (iv) olfactory services, and (vi) a complex service that provides a plurality of senses which at least include audiovisual, tactile, taste, and olfactory senses. The service quality may indicate one of low quality, medium quality, and high quality for each service item.

Meanwhile, the service quality may vary depending on not only the quality of service provided by the network but also the performance of a thing or a user terminal. Therefore, the mobility support server may provide the list of service qualities in consideration of performance information of the mobility support target. The performance information may be extracted by comparing the identifier of a device to a list of specifications held in advance. The mobility support server may provide information on various service qualities by combining the performance of the mobility support target and the performance of the network.

The service quality information may include a specific service quality and/or an available service quality range.

(4) Information on Mobility Support Target

A thing, a user terminal, or a user may be a mobility support target. A user or a thing may preset relevant information for network movement. The mobility support server may manage and provide a list of things, user terminals, or users that are mobility support targets. The mobility support target may include information on at least one target selected from the target group including the things, the user terminals, and the users.

Information on the mobility support target may include the identifier and/or type of the mobility support target.

(5) Ubiquitous Thing Information

The mobility support target may process computations through an adjacent ubiquitous thing in a distributed manner. The mobility support target may set information on a ubiquitous thing in order to process computations in a distributed manner while moving.

The ubiquitous thing information may include at least one selected from the group including the type of the ubiquitous thing, the minimum computation capability of the ubiquitous thing, and the identifier of the ubiquitous thing. The ubiquitous thing information may include information on at least one ubiquitous thing. Therefore, the ubiquitous thing information may include information on a plurality of ubiquitous things.

(6) Communication Mode

A communication mode may refer to at least one of various types of modes. In this case, the mobility support server may support mobility while maintaining a specific communication mode for a mobility support target according to a user's preferred setting value or a preset setting value.

Examples of possible communication modes will be described. (i) Based on a message transmission method, the communication mode may be at least one of a unicast mode, which indicates point-to-point communication, a multicast mode, which indicates point-to-multipoint communication, and a broadcasting mode.

(ii) Based on a mobile communication method, the communication mode may be at least one of 3G communication, 4G (LTE) communication, 5G communication, and 6G communication.

(iii) Based on a communication cost, the communication mode may be either free communication (=public network) or paid communication.

Communication modes may be classified into various types other than the above-described several types.

The service condition may include various items such as a network type, an access node terminal, a service quality, a mobility support target, a ubiquitous thing, and a communication mode. The service condition may include at least one item selected from the information group including network information, access node terminal information, service quality information, mobility support target information, communication mode information, and ubiquitous thing information. When the service condition includes a plurality of items, the mobility support server may support mobility in consideration of all complex service condition items.

A mobility support process will be described below on the basis of several representative service conditions. The mobility support is triggered when new mobility support is required due to the movement of a mobility support target.

The mobility support server may be a dedicated server that supports mobility for each service condition. Furthermore, the mobility support server may be a server that supports all combinations of various service conditions.

Figure 3:
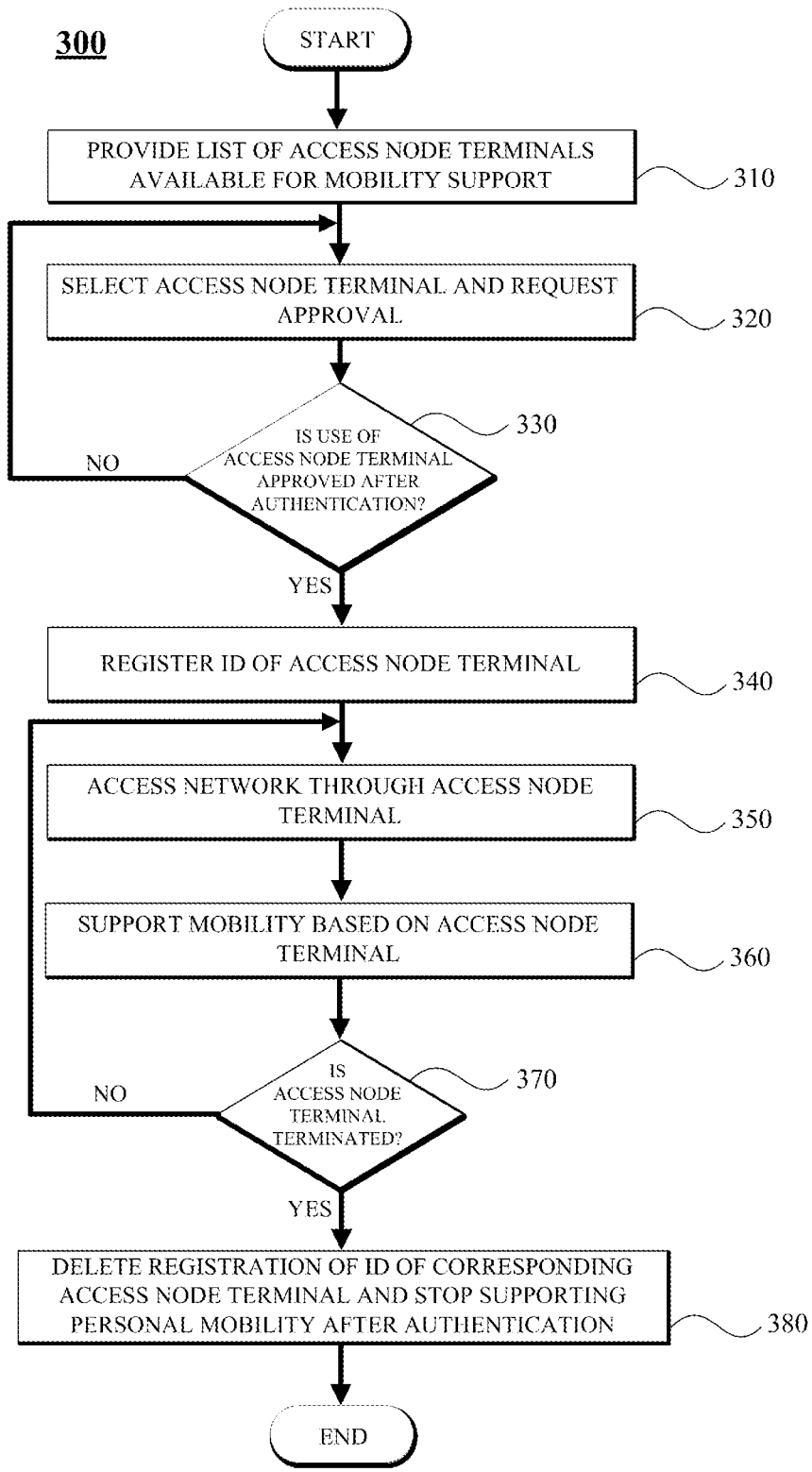
FIG. 3 illustrates an example of a mobility supporting process using an access node terminal.

FIG. 3 is an example of a mobility supporting process 300 using an access node terminal. Here, the mobility support server is a server that supports mobility for users using an access node terminal.

The mobility support server may provide a list of access node terminals available for mobility support (310). The mobility support server may broadcast a list of available access node terminals. Alternatively, when the mobility support target makes a request, the mobility support server may transmit its own list of access node terminals. Meanwhile, a network may transmit the list of access node terminals to the mobility support target directly or via the mobility support server.

The mobility support target selects at least one access node terminal from the list of available access node terminals and requests approval of the access node terminal (320). Alternatively, the mobility support server may select at least one access node terminal from the list of available access node terminals on the basis of a user's setting values or information of the access node terminal before movement. The mobility support server may authenticate an entity that has requested the approval and may approve the use of the requested access node terminal (330). When the authentication is successful and the use is approved, the mobility support server registers an identifier (ID) of the approved access node terminal (340).

The mobility support server may allow the mobility support target to access the network through the access node terminal (350). Subsequently, upon the movement of the mobility support target, the mobility support server supports mobility using a preregistered access node terminal (360).

The access node terminal may be connected to one of the surrounding indoor wireless IoT network, indoor wireless Internet network, outdoor wireless IoT network, or outdoor wireless Internet network. Therefore, the mobility support target may receive an Internet service through an access node terminal (a first access node terminal) adjacent to its location.

Subsequently, the mobility support target moves (or the first access node terminal moves) and thus may leave the coverage of the first access node terminal. At this time, the mobility support server checks whether there is an access node terminal (a second access node terminal) capable of supporting subsequent network access among access node terminals preregistered for the mobility support target. If available, the mobility support server may support mobility by performing control such that the mobility support target accesses the second access node terminal.

Subsequently, the access node terminal may be terminated from the mobility support service. A user or an administrator of the access node terminal may stop supporting mobility through the specific access node terminal. The mobility support server may check whether the corresponding access node terminal is terminated (370). When the access node terminal is terminated (YES in 370), the mobility support server authenticates an entity that has requested the termination and deletes the ID of the access node terminal requested to be terminated when the authentication is successful (380). The terminated access node terminal is not used for subsequent network access.

A process of supporting mobility for a user (a person) who uses an access node terminal (300) will be described with reference to FIG. 3. In this scenario, a user who possesses a user terminal or a thing may receive a network service using the access node terminal. In this scenario, a user who possesses a simple I/O device may also receive a network service using the access node terminal. In this scenario, a user who does not possess a thing or a user terminal may also receive a network service using the access node terminal positioned at a movement place. The access node terminal may be a device that the user is temporarily leasing. The access node terminal may be fixed or movable. The access node terminal may have the form of a device that follows a user in a certain area, such as a robot.

The mobility support server may provide a list of access node terminals capable of mobility support (310). The mobility support server may broadcast a list of available access node terminals. Alternatively, when the mobility support target makes a request, the mobility support server may transmit its own list of access node terminals.

Also, a network may transmit the list of access node terminals to the mobility support target directly or via the mobility support server (310). Furthermore, the user may use a simple I/O device or on-site device to check a list of access node terminals that can be used by the user.

The mobility support target selects at least one access node terminal from the list of available access node terminals and requests approval (320). The mobility support server may authenticate an entity that has requested the approval and may approve the use of the requested access node terminal (330). When the authentication is successful and the use is approved, the mobility support server registers an identifier (ID) of the approved access node terminal (340).

The mobility support server may allow the mobility support target to access the network through the access node terminal (350). Subsequently, when the mobility support target needs to be moved, the mobility support server supports mobility using a preregistered access node terminal (360).

The access node terminal may be connected to at least one of the surrounding indoor wireless IoT network, indoor wireless Internet network, outdoor wireless IoT network, or outdoor wireless Internet network. Therefore, the mobility support target may receive an Internet service through a access node terminal (a first access node terminal) adjacent to its location.

Subsequently, the mobility support target moves and thus may leave the coverage of the first access node terminal. At this time, the mobility support server checks whether there is a access node terminal (a second access node terminal) capable of supporting subsequent network access among access node terminals preregistered for the mobility support target. If available, the mobility support server may support mobility by performing control such that the mobility support target accesses the second access node terminal.

Subsequently, the access node terminal may be terminated from the mobility support service. A user or an administrator of the access node terminal may stop supporting mobility through the specific access node terminal. The mobility support server may check whether the corresponding access node terminal is terminated (370). When the access node terminal is terminated (YES in 370), the mobility support server authenticates an entity that has requested the termination and deletes the ID of the access node terminal requested to be terminated when the authentication is successful (380). The terminated access node terminal is not used for subsequent network access.

Figure 4:
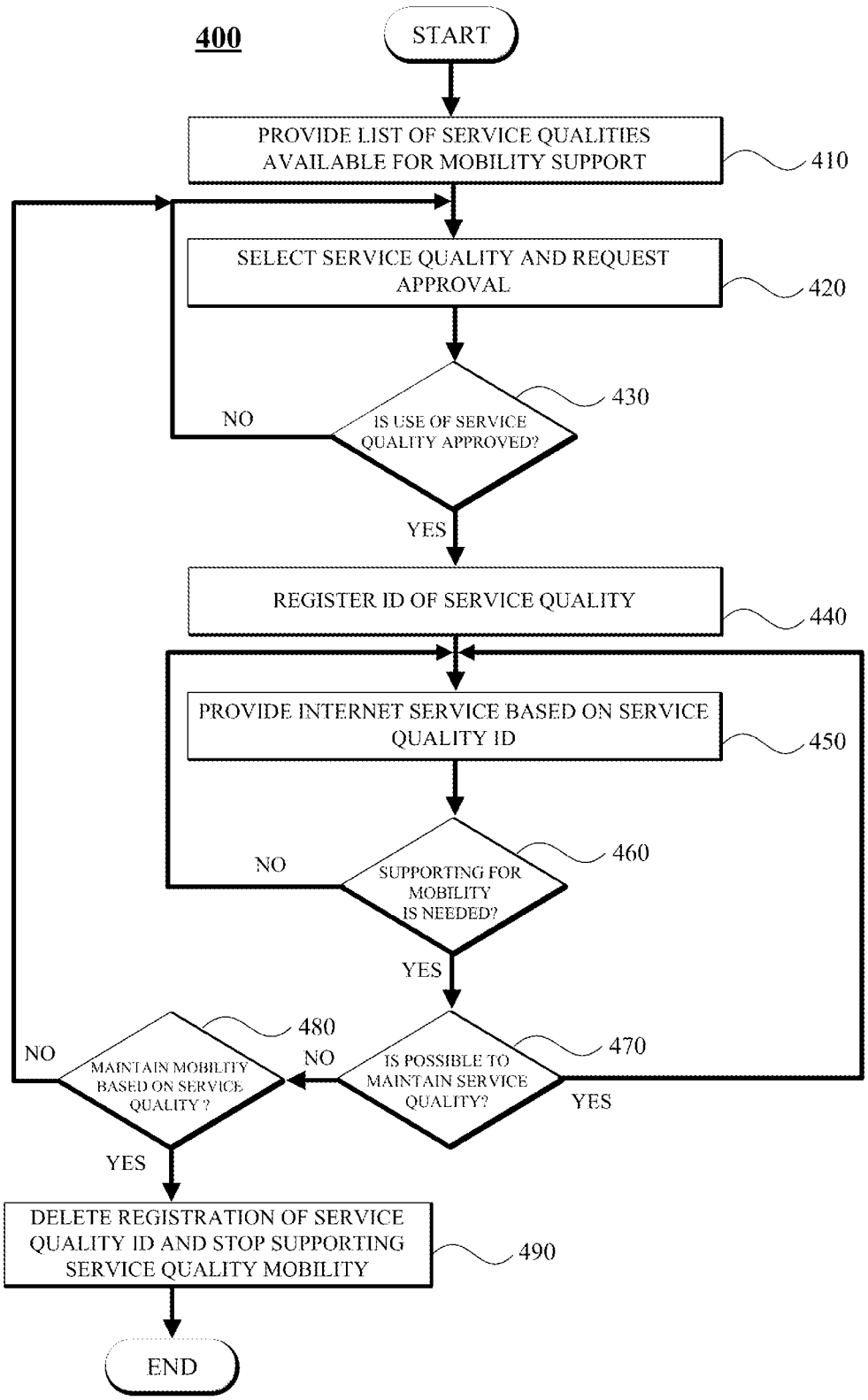
FIG. 4 illustrates an example of a service quality-based mobility supporting process.

FIG. 4 is an example of a service quality-based mobility supporting process 400. Here, the mobility support server is a server that supports mobility based on service quality.

The mobility support server may provide a list of service qualities available for mobility support (410). The mobility support server may broadcast a list of available service qualities. Alternatively, when the mobility support target makes a request, the mobility support server may transmit its own list of service qualities. For convenience of description, it is assumed that the service quality includes high quality, medium quality, or low quality. Meanwhile, a network may transmit the list of service qualities to the mobility support target directly or via the mobility support server (410).

As described above, the mobility support server may decide the type of service quality in consideration of service quality provided by the network and the performance of the mobility support target. Alternatively, the mobility support target may select one reception quality of the network on the basis of its performance.

The mobility support target selects at least one service quality from the list of available service qualities and requests approval (420). Alternatively, the mobility support server may select at least one service quality from the list of available service qualities on the basis of a user's setting values or service quality before movement. Here, the list of service qualities may include service types and a service quality for each type.

The mobility support server may authenticate an entity that has requested the approval and may approve the use of at least one of the requested service type and service quality (430). When the authentication is successful and the use is approved, the mobility support server registers an identifier (ID) of the approved service quality (440). The corresponding ID represents information indicating that a service of specific service quality is provided for a specific mobility support target. The mobility support server may allow the mobility support target to access one of the surrounding indoor wireless IoT network, indoor wireless Internet network, outdoor wireless IoT network, or outdoor wireless Internet network. At this time, the mobility support server is connected to a network capable of a low, medium, or high quality service that is selected in advance. That is, the mobility support server provides a service quality ID-based Internet service through the selected network or access node terminal (450). The mobility support server selects at least one of a network, an access node terminal, and a ubiquitous thing capable of supporting at least one of a registered service type and service quality to provide an Internet service. Furthermore, the mobility support server may select a network or an access node terminal capable of supporting the registered service quality or higher. That is, according to preset settings, the mobility support server may support a service quality greater than the user wants.

Subsequently, the mobility support server checks whether the mobility support target is needed for supporting mobility by movement (handover or roaming) (460). When the mobility is needed (Yes in 460), the mobility support server may check whether there is at least one of a network, an access terminal, and a ubiquitous thing capable of maintaining the service quality among networks capable of supporting the movement of the mobility support server (470). When there is a network capable of maintaining the service quality (YES in 470), the mobility support server performs control such that the mobility support target accesses at least one of another available network, access terminal, and ubiquitous thing that may be used by the mobility support target. Subsequently, the mobility support server provides an Internet service through at least one of a new network, access terminal, and ubiquitous thing.

Here, the service may be one of various types of services as described above. For example, when before movement, the service is a video service and the service quality is high resolution quality, the mobility support server may select at least one of an access terminal node, a network, and a ubiquitous thing that can support a high-resolution video service at the current time and continues to provide the service.

When it is not possible to maintain the service quality (NO in 470), the service support server may check whether to maintain for supporting mobility based on service quality (480). When the mobility service based on service quality is stopped (YES in 480), the mobility support server deletes the ID of the service quality and stops supporting the service quality mobility based on the service quality ID (490).

When the service quality-based movement continues (NO in 480), the mobility support server or network may provide a list of available service qualities and may provide a service by performing network connection based on a service quality selected by the mobility support target.

When it is difficult to satisfy the service quality at the current time, the mobility support server may provide the service by selecting at least one of an access terminal node, a network, and a ubiquitous thing capable of providing at least the same type of service (e.g., a video service). That is, in this case, the mobility support server may temporarily change the ID of the service quality and then provide an available service.

Meanwhile, the mobility support target may be connected to the network through the access node terminal. Even in this case, the mobility support server may provide a service quality-based service on the basis of the access node terminal. At this time, the movement of the mobility support target may be performed through the access node terminal.

Figure 5:
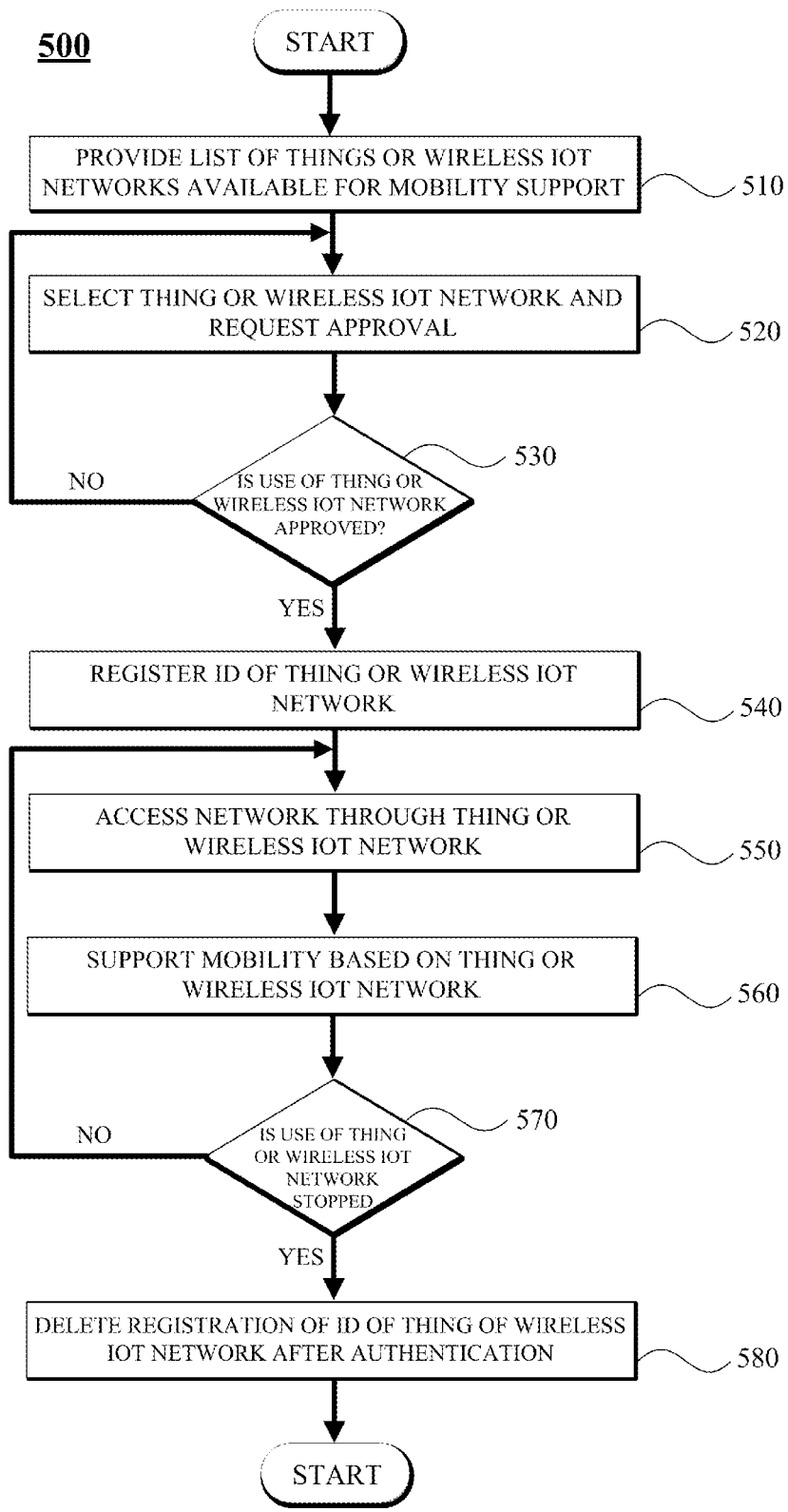
FIG. 5 illustrates an example of a ubiquitous thing-based or an Internet of Things (IoT)-based mobility supporting process.

FIG. 5 is an example of a ubiquitous thing-based or an IoT-based mobility supporting process 500. FIG. 5 is an example of supporting mobility based on a ubiquitous thing or a wireless IoT network. It is assumed that one wireless IoT network forms an independent network. Here, the mobility support server is a server that supports ubiquitous thing-based or IoT-based mobility.

The mobility support server may provide a list of ubiquitous things or wireless IoT networks available for mobility support (510). The mobility support server may broadcast a list of available ubiquitous things or wireless IoT networks. Alternatively, when the mobility support target makes a request, the mobility support server may transmit its own list of ubiquitous things or wireless IoT networks. Meanwhile, a network may transmit the list of ubiquitous things or wireless IoT networks to the mobility support target directly or via the mobility support server.

The mobility support target selects at least one ubiquitous thing or wireless IoT network from the list of available ubiquitous things or wireless IoT networks and requests approval (520). At this time, the mobility support target may select a wireless IoT network on the basis of a ubiquitous thing for edge computing. The mobility support target may select a plurality of ubiquitous things or wireless IoT networks to be used. Alternatively, the mobility support server may select at least one ubiquitous thing or wireless IoT network from the list of available ubiquitous things or wireless IoT networks on the basis of a user's settings or information on ubiquitous things or wireless Internet networks before movement.

The mobility support server may authenticate an entity that has requested the approval and may approve the use of the requested ubiquitous thing or wireless IoT network (530). When the authentication is successful and the use is approved, the thing mobility support server registers an identifier (ID) of the approved ubiquitous thing or wireless IoT network (540). The mobility support server may manage information on the approved ubiquitous thing or wireless IoT network. The ID of the thing or the wireless IoT network may include a plurality of IDs of ubiquitous things or wireless IoT networks.

The mobility support server may allow the mobility support target to access the network through the wireless IoT network (550). Alternatively, the mobility support server may allow the mobility support terminal to access the selected ubiquitous thing or wireless IoT network through a specific access node terminal. Subsequently, upon the movement of the mobility support target, the mobility support server supports mobility using a preregistered ubiquitous thing or wireless IoT network (560). The mobility support server may select a specific ubiquitous thing or wireless IoT network that is currently available for mobility support among the IDs of registered ubiquitous things or wireless IoT networks to support mobility. Alternatively, the mobility support server may select a ubiquitous thing or wireless IoT network available for mobility support and support mobility through an access node terminal identical to or different from the previously used terminal. The mobility support target may receive an Internet service through a first ubiquitous thing or wireless IoT network adjacent to its location.

Subsequently, the movement support target moves (due to a problem of the first ubiquitous thing or wireless IoT network) and thus may not receive a network service of the first wireless IoT network. At this time, the mobility support server checks whether there is a ubiquitous thing or wireless IoT network (a second ubiquitous thing or wireless IoT network) capable of supporting subsequent network access among ubiquitous things or wireless IoT networks preregistered for the mobility support target. When available, the mobility support server may support mobility by performing control such that the mobility support target accesses the second ubiquitous thing or wireless IoT network.

Subsequently, the wireless IoT network may be terminated from the mobility support service. A user or an administrator of the wireless IoT network may stop supporting mobility through the specific wireless IoT network. The mobility support server may check whether the corresponding wireless IoT network is terminated (570). When the corresponding wireless IoT network is terminated (YES in 570), the mobility support terminal authenticates an entity that has requested the termination and deletes the ID of the wireless IoT network requested to be terminated when the authentication is successful (580). The terminated ubiquitous thing or wireless IoT network is not used for subsequent network access.

A process of supporting mobility based on a ubiquitous thing will be described with respect to FIG. 5. In this scenario, the mobility support target is provided with mobility while using ubiquitous things located on a movement path. That is, the mobility support target seeks to receive mobility support in an environment capable of processing insufficient computational power in a distributed manner. A ubiquitous thing may be a device that is independently connected to an external network (a wireless Internet network). Also, a ubiquitous thing may be a device that constitutes the wireless IoT network together with other ubiquitous things.

The mobility support server may provide a list of ubiquitous things available for mobility support (510). The mobility support server may broadcast a list of available ubiquitous things. Alternatively, when the mobility support target makes a request, the mobility support server may transmit its own list of ubiquitous things. Furthermore, the mobility support server may provide a list of user terminals, which are mobility support targets, as well as a list of things. Meanwhile, the ubiquitous thing or the wireless IoT network may transmit a list of ubiquitous things to the mobility support target directly or via the mobility support server (510).

The mobility support target selects at least one ubiquitous thing from the list of available ubiquitous things and requests approval (520). The mobility support target may select a plurality of ubiquitous things to be used. The mobility support server may authenticate an entity that has requested the approval and may approve the use of the requested ubiquitous thing (530). When the authentication is successful and the use is approved, the thing mobility support server registers an identifier (ID) of the approved ubiquitous thing. The mobility support server may manage information on the approved ubiquitous thing.

The mobility support server may allow the ubiquitous thing selected by the mobility support target to be accessed through the network (550). Subsequently, upon the movement of the mobility support target, the mobility support server supports mobility using a preregistered ubiquitous thing (560).

The mobility support server may select a specific ubiquitous thing that is currently available for mobility support among the IDs of registered ubiquitous things to support mobility.

The mobility support target may receive an Internet service through a first ubiquitous thing adjacent to its location. At this time, the mobility support target may assign a certain computation to the first ubiquitous thing in order to process the computation. Later, the mobility support target may be supported for mobility. The cause for mobility may be movement of the mobility support target, failure of the first ubiquitous thing, a state of the first ubiquitous thing in which the assigned computation is not possible, an error of the IoT network including the first ubiquitous thing, or the like.

At this time, the mobility support server checks whether there is a ubiquitous thing (a second ubiquitous thing) that is available for assigned computation and is capable of supporting network access among ubiquitous things preregistered for the mobility support target. When a second ubiquitous thing is available, the mobility support server may support mobility by performing control such that the mobility support target accesses the second ubiquitous thing. Also, the mobility support target may assign a certain computation to the second ubiquitous thing in order to process the computation.

Subsequently, the specific ubiquitous thing may be terminated from the mobility support service. A user or an administrator of the ubiquitous thing may stop supporting mobility through the specific ubiquitous thing. The mobility support server may check whether the corresponding ubiquitous thing is terminated (570). When the corresponding ubiquitous thing is terminated (YES in 570), the mobility support terminal authenticates an entity that has requested the termination and deletes the ID of the ubiquitous thing requested to be terminated when the authentication is successful (580). The terminated ubiquitous thing is not used for subsequent network access.

The service condition may include at least one item selected from the condition group including a network type, an access node terminal, a service quality, a ubiquitous thing, a communication mode, and a mobility support target. Therefore, the mobility support server may provide a list of access node terminals, a list of service qualities, a list of ubiquitous things, a list of communication modes, or a list of mobility support targets and may support mobility according to a selected service condition. The mobility support server may provide at least one list selected from the list group including the list of access node terminals, the list of service qualities, the list of ubiquitous things, the list of communication modes, and the list of mobility support targets. The mobility support server may support mobility on the basis of combined service conditions.

When there are a plurality of service conditions and only some of the service conditions are satisfied, the mobility support server may support mobility for a mobility support target on the basis of at least one service condition with a high priority according to priorities preset for the service conditions. Alternatively, when there are a plurality of service conditions and some of the service conditions are satisfied, a mobility support target may select a desired service condition and receive mobility on the basis of the selected service condition.

Figure 6:
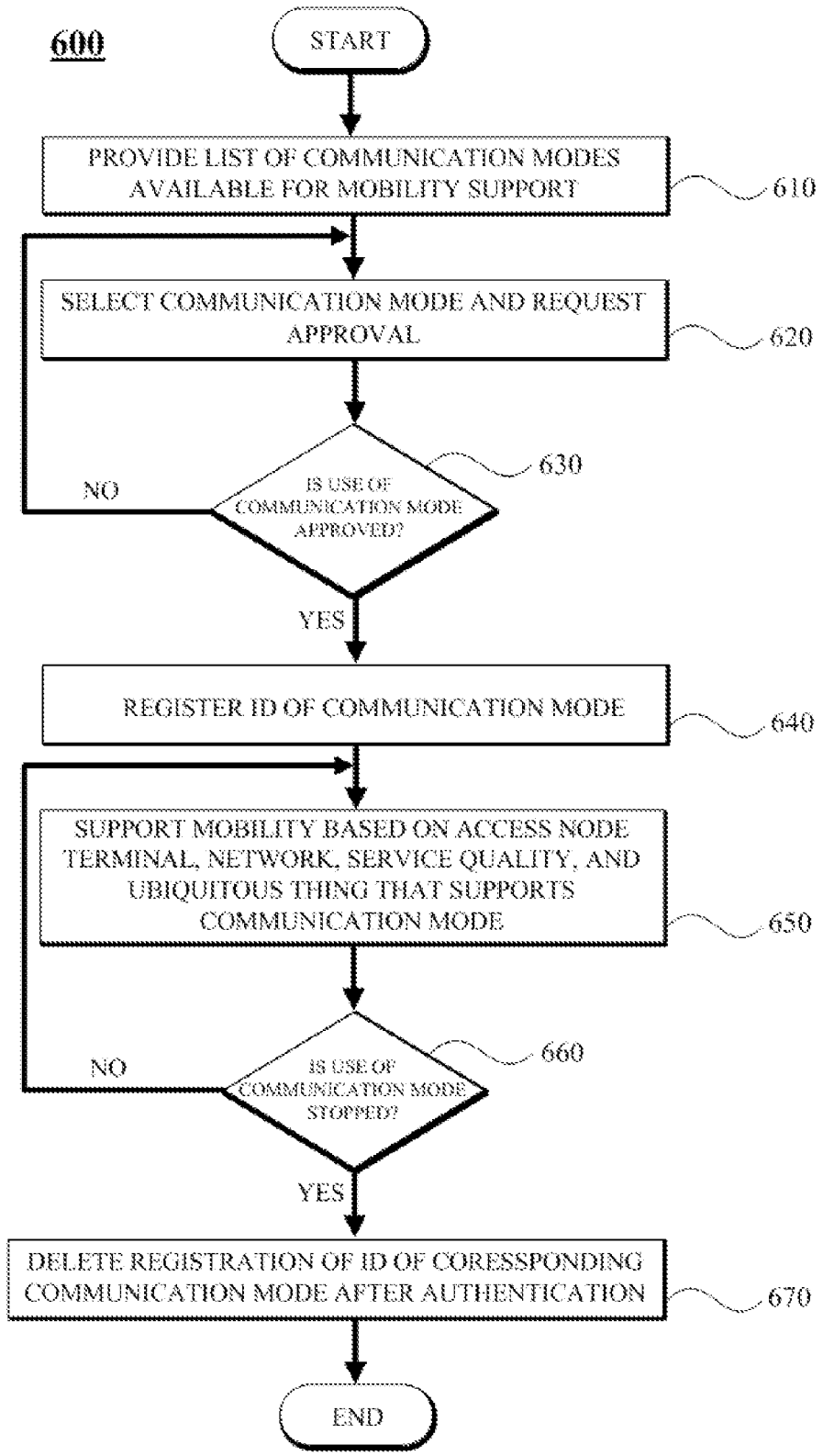
FIG. 6 illustrates an example of a communication mode-based mobility supporting process.

FIG. 6 is an example of a communication mode-based mobility supporting process 600. Here, the mobility support server is a server that supports a mobility support target on the basis of a communication mode.

The mobility support server may provide a list of communication modes that are currently available for mobility support (610). The mobility support server may broadcast the list of communication modes. Alternatively, when the mobility support target makes a request, the mobility support server may transmit its own list of communication modes. Meanwhile, a network may transmit the list of communication modes to the mobility support target directly or via the mobility support server.

The mobility support target selects an available communication mode and requests approval (620). The mobility support target may select a desired communication mode. Alternatively, the mobility support server may select at least one communication mode from the list of available communication modes on the basis of a communication mode before movement. For example, the mobility support server may select a communication mode such that the communication mode before movement is maintained.

The mobility support server may authenticate an entity that has requested the approval and may approve the use of the requested access node terminal (630). When the authentication is successful and the use is approved, the mobility support server registers an identifier (ID) of the approved communication mode (640).

The mobility support server may support mobility for the mobility support target using at least one of an access node terminal, a network, a service quality, and a ubiquitous thing that supports the corresponding communication mode (650).

Subsequently, the use of the current communication mode may be terminated. In this case, the mobility support server may check whether the corresponding communication mode is terminated (660). When the corresponding communication mode is terminated (YES in 660), the mobility support server may authenticate an entity that has requested the termination and delete the ID of the communication mode requested to be terminated when the authentication is successful (670). The terminated communication mode may not be used for subsequent network access.

Figure 7:
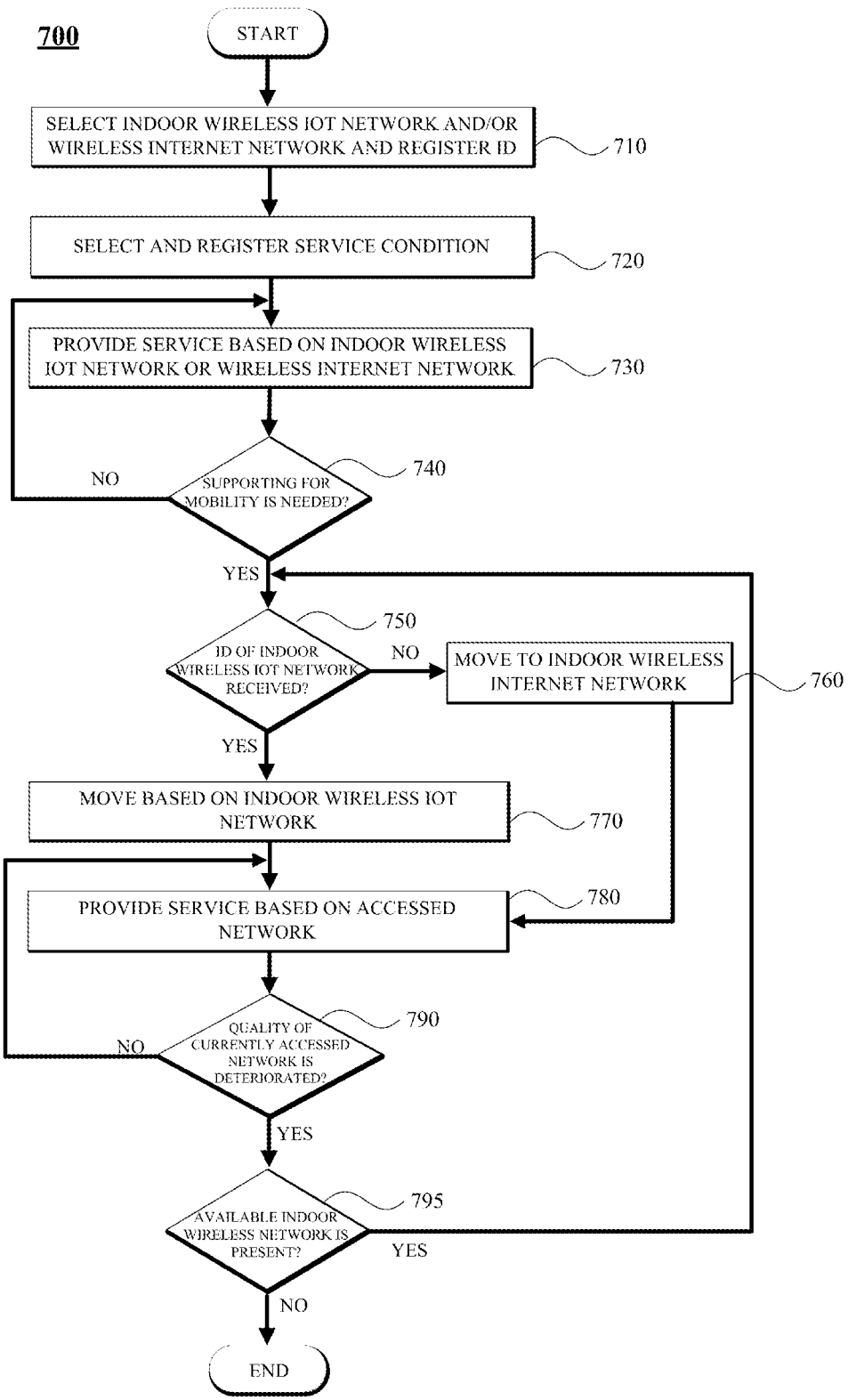
FIG. 7 illustrates an example of an indoor mobility supporting process.

FIG. 7 is an example of an indoor mobility supporting process 700. FIG. 7 is an example of providing an Internet service to a mobility support target on the basis of an indoor wireless IoT network and an indoor wireless Internet network.

The mobility support target may include various devices as described above. The mobility support target may assign a computation for a specific service to a ubiquitous thing constructing the IoT or a computing device, an indoor interworking device, or a server connected to a network in order to process the computation. In this case, the mobility support target may quickly receive the service result with low power consumption. Also, the mobility support target may be provided with the service at a low cost by using such a distributed processing technique. The result of the computation processed in such a distributed fashion may be provided to a user through a user terminal or another display device placed indoors.

The mobility support server provides a list of indoor wireless IoT networks that are available indoors and receives information on a wireless IoT network to be used from the mobility support target. The mobility support server registers an ID of a selected indoor wireless IoT network (710). In this case, the mobility support server may deliver a list of ubiquitous things for edge computing. The mobility support server may deliver information on an available ubiquitous thing while separately providing a list of ubiquitous things or providing a list of indoor wireless IoT networks. The indoor wireless IoT network may transmit a list of available indoor wireless IoT networks to the mobility support target directly or via the mobility support server. The indoor wireless IoT network may transmit a list of available ubiquitous things to the mobility support target directly or via the mobility support server.

Also, the mobility support server provides a list of indoor wireless Internet networks that are available indoors and receives information on an indoor wireless Internet network to be used from the mobility support target. The mobility support server may register an ID of a selected indoor wireless Internet network (710). The indoor wireless Internet network may transmit a list of available indoor wireless Internet networks to the mobility support target directly or via the mobility support server. Meanwhile, the indoor wireless Internet network may be provided without a user's selection. That is, the mobility support target may use the indoor wireless IoT network as a primary network and may use the indoor wireless Internet network as a secondary network when the indoor wireless IoT network cannot be used. For example, the mobility support target may preferentially use the indoor ubiquitous thing or the indoor wireless IoT network which is inexpensive and suitable for distributed processing.

The mobility support server may receive a service condition from a user or a terminal. The service condition selection process is as described above. The mobility support server registers a selected service condition (720). The service condition may include at least one of an access node terminal, a network type, a communication mode, and a service quality. Also, service conditions may be individually set for the indoor IoT network and the indoor wireless Internet network. That is, the indoor IoT network and the indoor wireless Internet network may have different access node terminals and/or different service qualities.

The mobility support server provides an Internet service that satisfies the service conditions to the mobility support target using the indoor wireless IoT network or the indoor wireless Internet service (730). As described above, the user terminal may be a device held by a user or another device (a computer device, a display device, etc.) placed indoors. In the latter case, when the user accesses an on-site device and authenticates himself or herself, the mobility support server may provide an Internet service to the on-site device according to a condition set by the user in advance or on site. The user may enter certain information or commands to the on-site device through a touch, a gesture input, a voice, a wireless folding keyboard, etc.

The mobility support server may support mobility for a service (IP-based data, Voice (VoIP), Audio (AoIP), Multimedia (MoIP), hologram, virtual reality/augmented reality (VR/AR), etc.) that maintains a quality of service (QoS) indoors. Also, the mobility support server may support mobility for a QoS-based thing (e.g., a smartphone band, smart glasses, a wearable device, etc.) indoors. The provided service may be a music reproduction, audio output, a navigation guide, a map service, a call service, or the like that is provided through a thing, a user terminal, an indoor ubiquitous thing, or a device placed indoors. The provided service may be in the form of sound output, display output, AR/VR device-based output, hologram output, and the like.

The mobility support server checks whether the mobility support target is needed for supporting mobility at indoors (740). The mobility support server may monitor the need of network movement on the basis of the location of the mobility support target. Various techniques may be utilized to detect the indoor location. Alternatively, the mobility support server may determine whether the network movement is necessary on the basis of the signal strength of the mobility support target. Alternatively, the mobility support server may support mobility when a request for the network movement is received from the mobility support target.

When the mobility is needed (YES in 740), the mobility support server checks whether there is another indoor ubiquitous thing or indoor IoT network that is available for mobility support on the basis of the location of the mobility support target (750). The mobility support server may check whether the ID of a preregistered indoor ubiquitous thing or indoor IoT network is received (750). The mobility support server may check a network to which the mobility support target can move on the basis of the received network ID.

When there is an indoor ubiquitous thing or indoor wireless IoT network to which the mobility support target can move (YES in 750), the mobility support server performs control such that the mobility support target accesses the new indoor ubiquitous thing or indoor wireless IoT network (770). In this case, the mobility support target may move to the new indoor ubiquitous thing or indoor wireless IoT network and then receive an Internet service.

When there is no indoor ubiquitous thing or indoor wireless IoT network to which the mobility support target can move (NO in 750), the mobility support server performs control such that the mobility support target accesses an available indoor ubiquitous thing or indoor wireless network (760). In this case, the mobility support target may move to the indoor ubiquitous thing or indoor wireless network and then receive an Internet service. When the indoor wireless IoT network and the indoor wireless network have different protocols, the mobility support target should be a device that supports two communication schemes.

The mobility support server provides an Internet service to the mobility support target through the newly accessed network (the indoor wireless IoT network or indoor wireless Internet network) (780).

The mobility support server checks whether the quality of the currently accessed network has deteriorated (790). When the quality has not deteriorated (NO in 790), the mobility support server continues to provide the service through the current network. When the quality of the current network has deteriorated (YES in 790), the mobility support server may check whether there is another indoor ubiquitous thing, indoor wireless IoT network, or indoor wireless Internet network in which the mobility support target is registered (795). When there is an available indoor ubiquitous thing, indoor wireless IoT network, or indoor wireless Internet network (YES in 795), the mobility support server may support mobility for the mobility support target using the corresponding thing or Internet network. When there is no other available registered network (NO in 795), the mobility support server may stop the service.

Figure 8:
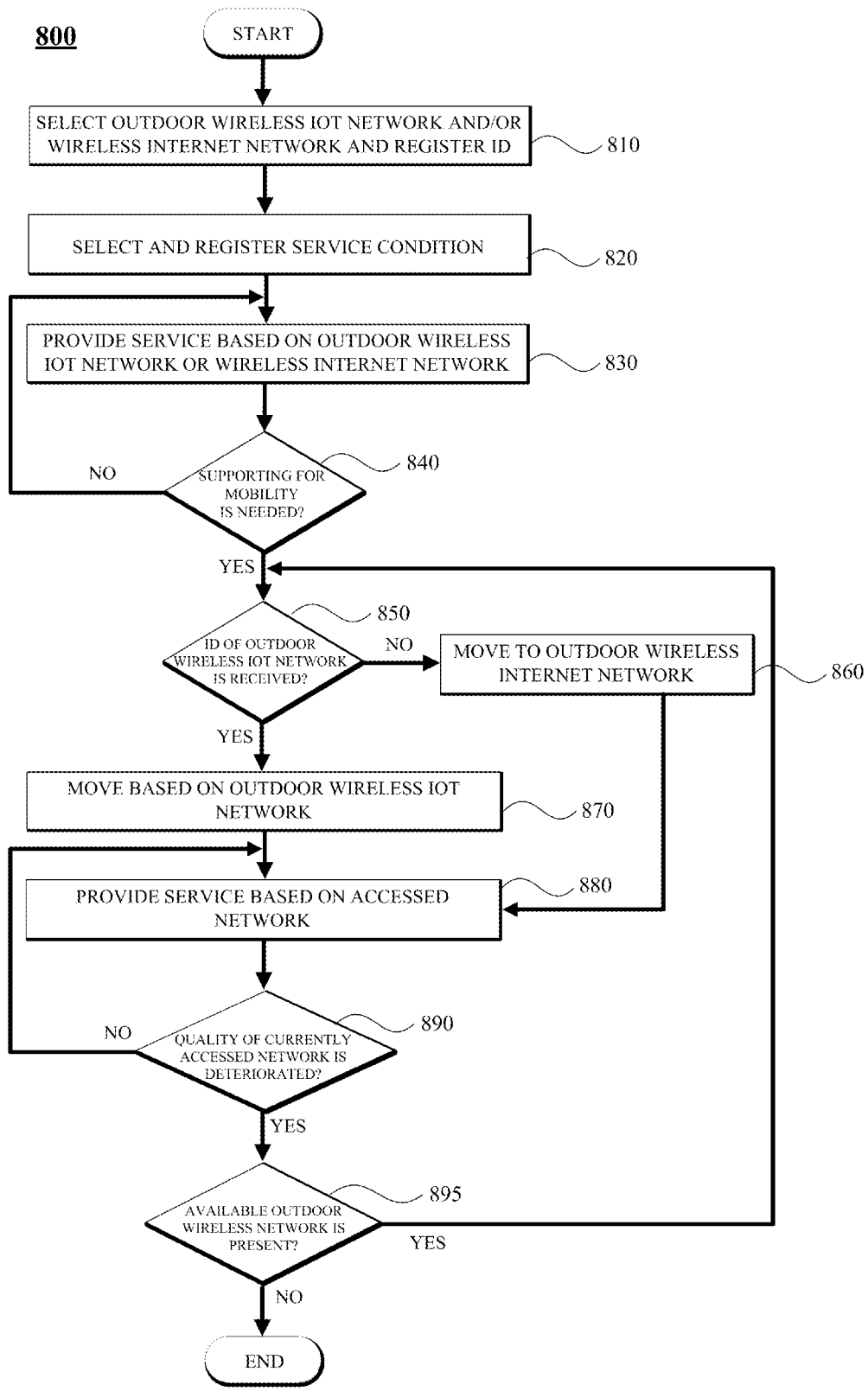
FIG. 8 illustrates an example of an outdoor mobility supporting process.

FIG. 8 is an example of an outdoor mobility supporting process 800. FIG. 8 is an example of providing an Internet service to a mobility support target on the basis of an outdoor wireless IoT network and an outdoor wireless Internet network.

The mobility support target may include various devices as described above. The mobility support target may assign a computation for a specific service to a ubiquitous thing constructing the IoT or a computing device, an outdoor interworking device, or a server connected to a network in order to process the computation. In this case, the mobility support target may quickly receive the service result with low power consumption. Also, the mobility support target may be provided with the service at a low cost by using such a distributed processing technique. The result of the computation processed in such a distributed fashion may be provided to a user through a user terminal or another display device placed outdoors.

Mobility support targets used outdoors may be similar to mobility support targets used indoors. Furthermore, mobility support targets may be automobiles, transportation infrastructure devices, building infrastructure devices, and the like that are used in outdoor environments.

The mobility support server provides a list of outdoor wireless IoT networks that are available outdoors and receives information on a wireless IoT network to be used from the mobility support target. The mobility support server registers an ID of a selected outdoor wireless IoT network (810). In this case, the mobility support server may deliver a list of ubiquitous things for edge computing. The mobility support server may deliver information on an available ubiquitous thing while separately providing a list of ubiquitous things or providing a list of outdoor wireless IoT networks. The outdoor wireless IoT network may transmit a list of available indoor wireless IoT networks to the mobility support target directly or via the mobility support server. The outdoor wireless IoT network may transmit a list of available ubiquitous things to the mobility support target directly or via the mobility support server.

Also, the mobility support server provides a list of outdoor wireless Internet networks that are available outdoors and receives information on an outdoor wireless Internet network to be used from the mobility support target. The mobility support server may register an ID of a selected outdoor wireless Internet network (810). The outdoor wireless Internet network may transmit a list of available outdoor wireless Internet networks to the mobility support target directly or via the mobility support server. Meanwhile, the outdoor wireless Internet network may be provided without a user's selection. That is, the mobility support target may use the outdoor wireless IoT network as a primary network and may use the outdoor wireless Internet network as a secondary network when the outdoor wireless IoT network cannot be used. For example, the mobility support target may preferentially use the outdoor wireless IoT network which is inexpensive and suitable for distributed processing.

The mobility support server may receive a service condition from the mobility support target. The service condition selection process is as described above. The mobility support server registers a selected service condition (820). The service condition may include at least one of a mobility support target, an access node terminal, a network type, a communication mode, and a service quality. Also, service conditions may be individually set for the outdoor IoT network and the outdoor wireless Internet network. That is, the outdoor IoT network and the outdoor wireless Internet network may have different access node terminals and/or different service qualities.

The mobility support server provides an outdoor ubiquitous thing or an outdoor Internet service that satisfies the service conditions to the mobility support target using the outdoor wireless IoT network or the outdoor wireless Internet network (830). As described above, the user terminal may be a device held by a user or another device (a computer device, a display device, etc.) placed outdoors, or a device around a road (an automobile or a traffic infrastructure device). In the case of an on-site terminal, when the user accesses the on-site device and authenticates himself or herself, the mobility support server may provide an Internet service to the on-site device according to a condition set by the user in advance or on site. The user may enter certain information or commands to the on-site device through a touch, a gesture input, a voice, a wireless folding keyboard, etc.

The mobility support server may support mobility for a service (IP-based data, VoIP, AoIP, MoIP, hologram, VR/AR, etc.) that maintains a quality of service (QoS) outdoors. Also, the mobility support server may support mobility for a QoS-based thing (e.g., a smartphone band, smart glasses, a wearable device, etc.) outdoors. Also, the mobility support server may support mobility for a QoS-based thing in an outdoor automobile communication.

The provided service may be a music reproduction, an audio output, a navigation guide, a map service, a call service, or the like that is provided through a thing, a user terminal, or a device placed outdoors. The provided service may be in the form of sound output, display output, AR/VR device-based output, hologram output, and the like.

The mobility support server monitors checks whether the mobility support target is needed for supporting mobility at outdoors (840). The mobility support server may monitor the need of network movement on the basis of the location of the mobility support target. Various techniques may be utilized to detect the outdoor location. Alternatively, the mobility support server may determine whether the network movement is necessary on the basis of the received signal strength of the mobility support target. Alternatively, the mobility support server may support mobility when a request for the network movement is received from the mobility support target.

When the mobility is needed (YES in 840), the mobility support server checks whether there is another outdoor ubiquitous thing or outdoor IoT network that is available for mobility support on the basis of the location of the mobility support target (850). The mobility support server may check whether the ID of a preregistered outdoor ubiquitous thing or outdoor IoT network is received (850). The mobility support server may check a network to which the mobility support target can move on the basis of the received network ID.

When there is an outdoor ubiquitous thing or outdoor wireless IoT network to which the mobility support target can move (YES in 850), the mobility support server performs control such that the mobility support target accesses the new outdoor ubiquitous thing or outdoor wireless IoT network (870). In this case, the mobility support target may move to the new outdoor ubiquitous thing or outdoor wireless IoT network and then receive an Internet service.

When there is no outdoor ubiquitous thing or outdoor wireless IoT network to which the mobility support target can move (NO in 850), the mobility support server performs control such that the mobility support target accesses an available outdoor ubiquitous thing or outdoor wireless network (860). In this case, the mobility support target may move to the outdoor ubiquitous thing or outdoor wireless network and then receive an Internet service. When the outdoor wireless IoT network and the outdoor wireless network have different protocols, the mobility support target should be a device that supports two communication schemes.

The mobility support server provides an Internet service to the mobility support target through the newly accessed network (the outdoor ubiquitous thing, the outdoor wireless IoT network, or the outdoor wireless Internet network) (880).

The mobility support server checks whether the quality of the currently accessed network has deteriorated (890). When the quality has not deteriorated (NO in 890), the mobility support server continues to provide the service through the current network. When the quality of the current network has deteriorated (YES in 890), the mobility support server checks whether there is another outdoor ubiquitous thing, outdoor wireless IoT network, or outdoor wireless Internet network in which the mobility support target is registered (895). When there is an available registered outdoor ubiquitous thing, outdoor wireless IoT network, or outdoor wireless Internet network (YES in 895), the mobility support server may support mobility for the mobility support target using the corresponding ubiquitous thing or Internet network. When there is no other available registered Internet network (NO in 895), the mobility support server may stop the service.

Figure 9:
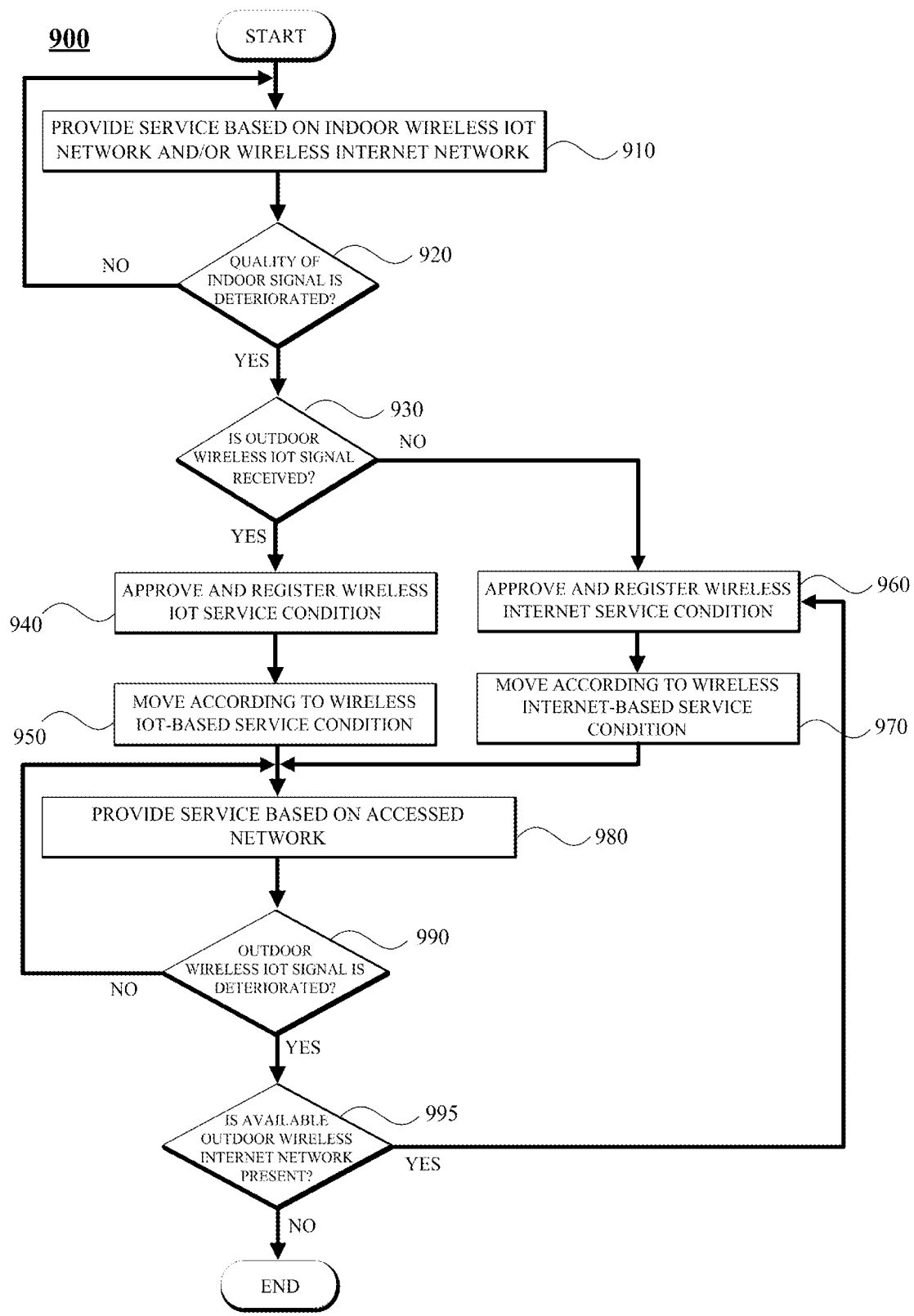
FIG. 9 illustrates an example of a mobility supporting process from an indoor place to an outdoor place.

FIG. 9 is an example of a mobility supporting process 900 from an indoor place to an outdoor place.

The mobility support target may receive a service based on an indoor wireless IoT network or an indoor wireless Internet network (910). The mobility support server monitors the quality of a signal received by the mobility support target (920). When the quality of the indoor signal is maintained (NO in 920), the mobility support server continues to provide an Internet service to the current indoor network. The signal quality may be evaluated using whether the received signal strength is less than a reference value.

When the quality of the indoor signal has deteriorated (YES in 920), the mobility support server checks whether the mobility support target receives a signal of an outdoor wireless IoT network (930). When the mobility support target receives the signal of the outdoor wireless IoT network (YES in 930), the mobility support server may provide an Internet service to the mobility support target using the outdoor wireless IoT network. When the mobility support target does not receive the signal of the outdoor wireless IoT network (NO in 930), the mobility support server may provide an Internet service to the mobility support target using the outdoor wireless Internet network. The mobility support target may use the outdoor wireless IoT network as a primary network and may use the outdoor wireless Internet network as a secondary network when the outdoor wireless IoT network cannot be used. For example, the mobility support target may preferentially use the outdoor wireless IoT network, which is inexpensive and suitable for distributed processing. Meanwhile, the indoor mobility support server may confirm reception of the outdoor signal by the mobility support target. A subsequent process of moving to an outdoor place may be performed by delivering necessary information to the outdoor mobility support server.

When a signal is received from the outdoor wireless IoT network (YES in 930), the mobility support target may select a wireless IoT network to be used from a list of available outdoor wireless IoT networks and request approval. The mobility support server may receive a service condition from the mobility support target. The mobility support server approves and registers the service condition (940). The service condition includes at least one of a type (identifier) of the outdoor wireless IoT network, a service quality, a ubiquitous thing, a communication mode, and an access node terminal. The mobility support server provides an Internet service corresponding to the service condition to the mobility support target using the outdoor wireless IoT network. Also, the mobility support server may support mobility for the mobility support target using outdoor wireless IoT networks (950). The mobility corresponding to the service condition is as described above.

When the signal of the outdoor wireless IoT network is not received (NO in 930), the mobility support target selects information on a wireless Internet network to be used from a list of available outdoor wireless Internet networks and requests approval. The mobility support server may receive a service condition from the mobility support target. The mobility support server approves and registers the service condition (960). The service condition includes at least one of a type of the mobility support target, a type (identifier) of the outdoor wireless Internet network, a service quality, a communication mode, and an access node terminal. The mobility support server provides an Internet service corresponding to the service condition to the mobility support target using the outdoor wireless Internet network. Also, the mobility support server may support mobility for the mobility support target using outdoor wireless Internet networks (970). The mobility corresponding to the service condition is as described above.

The mobility support server provides an Internet service on the basis of the currently accessed network (980).

The mobility support server monitors whether the quality of the outdoor signal of the currently accessed network has deteriorated (990). When the quality of the outdoor signal is maintained (NO in 990), the mobility support server continues to provide an Internet service on the basis of the currently accessed network. When the quality of the outdoor signal has deteriorated (NO in 990), based on information on an available outdoor wireless Internet network, the mobility support server provides an Internet service for the mobility support target using the outdoor wireless Internet network according to a new service condition or the same service condition as before.

When the signal quality of the outdoor wireless IoT network has deteriorated (YES in 990), the mobility support server may check whether there is an available outdoor wireless Internet network (995). When there is an available outdoor wireless Internet network that satisfies the signal quality (YES in 995), the mobility support server may support mobility for the mobility support target using the corresponding outdoor wireless Internet network. When there is no registered wireless Internet network or when the quality of the current outdoor wireless Internet network had deteriorated (NO in 995), the mobility support server may stop the service.

Figure 10:
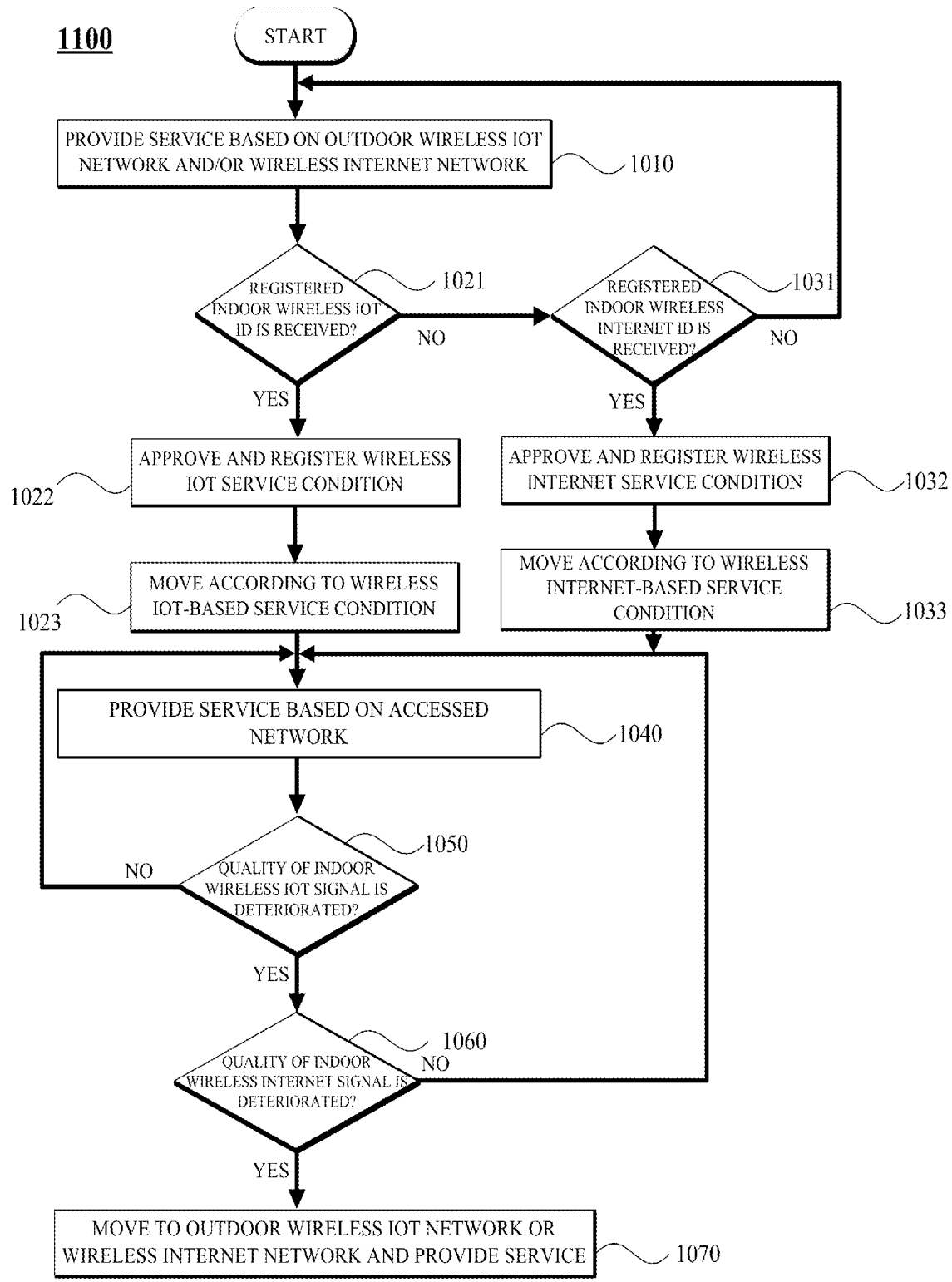
FIG. 10 illustrates an example of a mobility supporting process from an outdoor place to an indoor place.

FIG. 10 is an example of a mobility supporting process 1000 from an outdoor place to an indoor place. The mobility support target may receive a service based on an outdoor wireless IoT network or an outdoor wireless Internet network (1010).

The mobility support target may use an indoor network as a primary network with a high priority and may use an outdoor network as a secondary network. For example, the mobility support target may prefer the indoor network which is more inexpensive than the outdoor network.

The mobility support target may preferentially use the indoor wireless IoT network which is inexpensive and suitable for distributed processing. First, the mobility support server may check whether the mobility support target receives a signal (ID) of a registered indoor ubiquitous thing or indoor wireless IoT network (1021). When the mobility support target does not receive the ID of the indoor ubiquitous thing or the indoor wireless IoT network (NO in 1021), the mobility support server may check whether the mobility support target receives a signal (ID) of a registered indoor wireless Internet network (1031). When the mobility support target does not receive the signal of the indoor wireless Internet network (NO in 1031), the mobility support server continues to provide the Internet service through the outdoor network.

When the mobility support target receives the signal of the indoor wireless IoT network (YES in 1021), the mobility support target selects information on an indoor ubiquitous thing or indoor wireless IoT network to be used from a list of available indoor ubiquitous things or available indoor IoT networks and requests approval. The mobility support server may receive a service condition for the indoor ubiquitous thing or the indoor wireless IoT network from the mobility support target. The mobility support server approves and registers the service condition (1022).

The service condition includes at least one of a type (identifier) of the indoor wireless IoT network, a ubiquitous thing, a service quality, a communication mode, and an access node terminal. The mobility support server provides an Internet service corresponding to the service condition to the mobility support target using the indoor ubiquitous thing or the indoor wireless IoT network. Also, the mobility support server may support mobility for the mobility support target using indoor ubiquitous things or indoor wireless IoT networks (1023). The mobility corresponding to the service condition is as described above.

When the mobility support target does not receive a signal of the indoor ubiquitous thing or the indoor wireless IoT network (NO in 1021) but receives a signal of the indoor wireless Internet network (YES in 1031), the mobility support target may select information on the indoor wireless Internet network to be used from a list of indoor wireless Internet networks through which signals are received indoors and may request approval.

The mobility support server may receive a service condition for the indoor wireless Internet network from the mobility support target. The mobility support server approves and registers the service condition (1032). The service condition includes at least one of a type (identifier) of the indoor wireless Internet network, a service quality, a communication mode, and an access node terminal. The mobility support server provides an Internet service corresponding to the service condition to the mobility support target using the indoor wireless Internet network. Also, the mobility support server may support mobility for the mobility support target using indoor wireless Internet networks (1033). The mobility corresponding to the service condition is as described above.

The mobility support server provides an Internet service on the basis of the currently accessed network (1040).

The mobility support server monitors whether the quality of the indoor signal of the indoor wireless IoT network that is currently accessed by the mobility support target has deteriorated (1050). When the quality of the indoor signal is maintained (NO in 1050), the mobility support server provides an Internet service on the basis of the currently accessed indoor wireless IoT network.

When the quality of the signal of the indoor wireless IoT network received by the mobility support target has deteriorated (NO in 1050), the mobility support server confirms the quality of the signal of the indoor wireless Internet network received by the mobility support target (1060). When the quality of the signal of the indoor wireless Internet network received by the mobility support target is higher than or equal to a reference quality (NO in 1060), the mobility support server provides an Internet service on the basis of the currently accessed indoor wireless Internet network.

When the quality of the signal of the indoor wireless Internet network received by the mobility support target has deteriorated (YES in 1060), the mobility support target may select a network desired to be used, which is one of an available outdoor wireless IoT network or an available outdoor wireless Internet network, on the basis of the level of the signal received by the mobility support target and may request approval. The mobility support server supports the mobility support target in moving to the outdoor wireless IoT network or the outdoor wireless Internet network and then provides an Internet service (1070).

Meanwhile, when the quality of the outdoor network does not meet a reference quality, the mobility support server may stop providing the service to the corresponding mobility support target.

Figure 11:
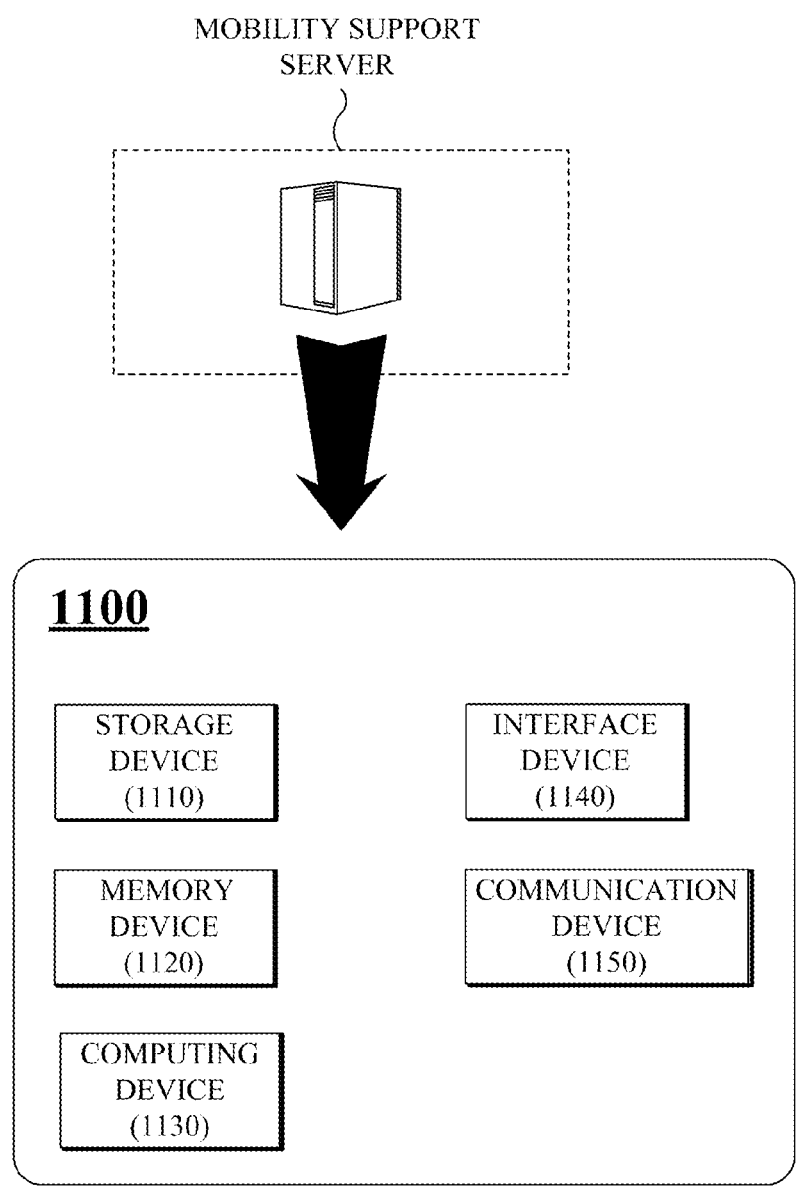
FIG. 11 illustrates an example of a hardware configuration of a mobility support server.

FIG. 11 is an example of a configuration of a mobility support server 1100. FIG. 11 is an example of a hardware configuration of the mobility support server 1100. The mobility support server 1100 of FIG. 11 corresponds to the mobility support server 130 or 180 of FIG. 1. The mobility support server 1100 supports mobility for the mobility support target indoors only, outdoors only, or both indoors and outdoors.

The mobility support server 1100 may include a storage device 1110, a memory 1120, a computing device 1130, an interface device 1140, and a communication device 1150.

The storage device 1110 may store a program for controlling mobility.

The storage device 1110 may store a list of available networks. The network list may include information on at least one of an indoor wireless IoT network, an indoor wireless Internet network, an outdoor wireless IoT network, and an outdoor wireless Internet network. The network list may include information on networks capable of providing signals of a certain quality according to a location or area.

The storage device 1110 may store a list of ubiquitous devices including information on ubiquitous thing(s) for assigning distributed processing together with or separately from the wireless IoT.

The storage device 1110 may also store a list of service qualities that stores the types of service qualities. The storage device 1110 may also store a list of mobility support targets.

The storage device 1110 may store a list of available access node terminals and/or things. The list of access node terminals and things includes information on access node terminals and/or things available indoors and/or outdoors. The list of access node terminals and things may include information on networks capable of providing signals of a certain quality according to a location or an area. The information of the list of access node terminals and things may be updated according to the movement of an access node terminal. An access node terminal is meant to include a user's portable terminal, a wearable device, an IoT device, a thing, and the like, as described above.

The storage device 1110 may store a list of service qualities. The service quality list may include classification information for service qualities according to a criterion such as signal strength. The service quality list may include different classifications or criteria depending on a network type. Also, the service quality list may include different classifications or criteria depending on an access node terminal and a thing.

The storage device 1110 may store at least one list selected from the service list group including a list of available networks including an indoor wireless Internet network, an indoor wireless IoT network, an outdoor wireless Internet network, and an outdoor wireless IoT network, a list of ubiquitous devices for indoor ubiquitous things and/or outdoor ubiquitous things, a list of service qualities that stores the types of service qualities, a list of things, users, or user terminals, which are mobility support targets, and a communication mode list.

The storage device 1110 may store a service condition received from a user or an external object.

The memory 1120 may store temporary data generated while the mobility support server 1100 controls mobility.

The interface device 1140 is a device that receives certain commands or information from the user. The interface device 1140 may receive certain commands or data from an external input device. The interface device 1140 may receive information on a network list, a service condition, a network selection scheme, and the like from an external input device connected through wired or wireless communication.

The communication device 1150 refers to an element configured to receive and transmit certain information through a network. The communication device 1150 may receive information on a network list, a service condition, a network selection scheme, and the like from an external object. The communication device 1150 may receive certain information or requests from a mobility support target. For example, the communication device 1150 may receive the strength or quality of a signal received from the mobility support target. The communication device 1150 may directly receive a signal from a network. The communication device 1150 may receive information necessary for another mobility support server.

Also, the communication device 1150 may transmit control commands and information to an external object. The communication device 1150 may transmit information necessary for movement to a mobility support target. Also, the communication device 1150 may transmit necessary information to another mobility support server.

The communication device 1150 and the interface device 1140 are devices that transmit and receive certain data or instructions from the outside. A communication device 1150 or an interface device 1140 that receives specific data or information may be collectively referred to as an input device. Alternatively, a communication device 1150 or an interface device 1140 that inputs and outputs specific data or information may be collectively referred to as an input/output device.

The computing device 1130 may decide an available network according to a service condition at the time of initial network access and mobility support. The computing device 1130 may perform control such that an Internet service is provided to a mobility support target through the determined network.

The computing device 1130 may perform a computation to support mobility for the mobility support target using an access node terminal or thing included in a service condition on the basis of the location of the mobility support target.

The computing device 1130 may select at least one of a plurality of networks or heterogeneous networks on the basis of at least one of a preset priority, the location of the mobility support target, and a signal quality.

The computing device 1130 may perform a computation to support mobility through an available network, an available access node terminal, or an available ubiquitous thing when it is possible to maintain the service quality included in the service condition. When it is not possible to maintain the selected service quality, the computing device 1130 may provide a list of new service qualities to the mobility support target and may perform a computation to support mobility through another network or another access node terminal or thing on the basis of a newly selected service quality.

When it is not possible to maintain a selected communication mode, the computing device 1130 may provide a list of new communication modes to the mobility support target and may perform a computation to support mobility through another network or another access node terminal or thing on the basis of a newly selected communication mode.

The computing device 1130 checks a service provision time (e.g., a content playback time) in which a service is provided to the mobility support target so that seamless continuous processing is possible even if mobility occurs. The computing device 1130 may perform a computation for continuously performing the service when the mobility support target accesses another network and may perform a real-time roaming computation when the mobility support target is called. The computing device 1130 may compute information for supporting seamless handover or real-time roaming mobility on the basis of a service condition (at least one of a network type, the type of a ubiquitous thing, the presence or absence of a ubiquitous thing, a service quality, an access node terminal, and a communication mode).

The computing device 1130 may check a service provision time (e.g., a content playback time) in which a service is provided to a specific device placed at a specific location so that seamless continuous handover processing is possible according to mobility. When another specific device placed in another area is accessed, the computing device 1130 may perform a computation for performing control such that continuous content is provided through another specific device on the basis of the playback time. Furthermore, the computing device 1130 may perform a computation for updating network information used by the mobility support target in real time such that real-time roaming is possible when the mobility support target is called.

The computing device 1130 may be a device for processing data and performing a certain computation, such as a processor, an application processor, and a chip with an embedded program.

Figure 12:
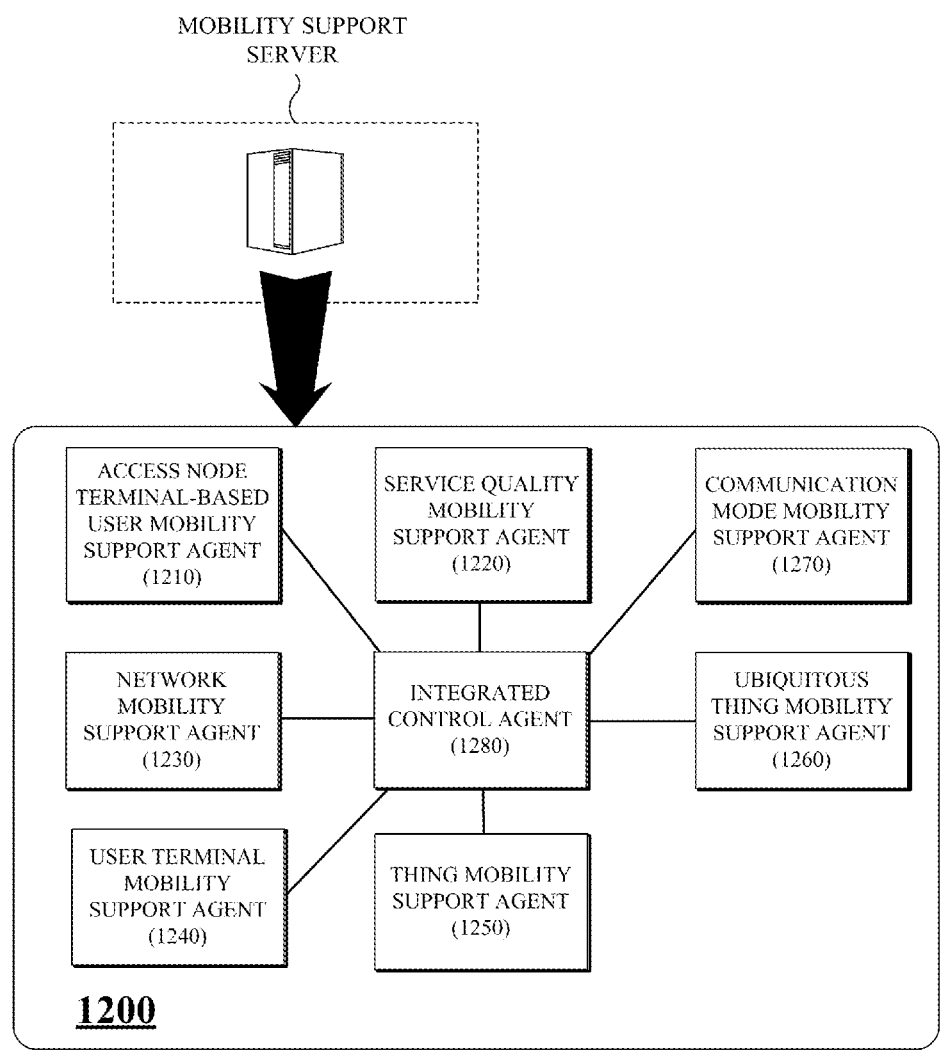
FIG. 12 illustrates an example of a software configuration of a mobility support server.

FIG. 12 is an example of a software configuration 1200 of a mobility support server.

An access node terminal-based user mobility support agent 1210 is an agent that supports user mobility using the above-described access node terminal. The access node terminal-based user mobility support agent 1210 may be at least one of a home agent (HA), foreign agent (FA), session initiation protocol (SIP) Home Register, and SIP Foreign Register.

A service quality mobility support agent 1220 is an agent that supports the above-described service quality-based mobility. The service quality mobility support agent 1220 may be at least one of HA, FA, SIP Home Register, and SIP Foreign Register.

A network mobility support agent 1230 is an agent that supports mobility using wireless networks. For example, the network mobility support agent 1230 may be an agent that supports mobility using at least one of the network group including an indoor IoT network, an indoor wireless Internet network, an outdoor IoT network, and an outdoor wireless Internet network. The network mobility support agent 1230 may be at least one of HA, FA, SIP Home Register, and SIP Foreign Register.

A user terminal mobility support agent 1240 is an agent that supports mobility for a user terminal. The user terminal mobility support agent 1240 may be at least one of HA, FA, SIP Home Register, and SIP Foreign Register.

A thing mobility support agent 1250 is an agent that supports mobility for a thing. The thing mobility support agent 1250 may be at least one of HA, FA, SIP Home Register, and SIP Foreign Register.

A ubiquitous thing mobility support agent 1260 is an agent that supports mobility using a ubiquitous thing. The ubiquitous thing mobility support agent 1250 may be at least one of HA, FA, SIP Home Register, and SIP Foreign Register.

A communication mode mobility support agent 1270 is an agent that supports the above-described communication mode mobility. The communication mode mobility support agent 1270 may be at least one of HA, FA, SIP Home Register, and SIP Foreign Register.

An integrated control agent 1280 is a control agent for supporting mobility for a plurality of use conditions and/or different types of home and foreign objects. The integrated control agent 1280 supports integrated mobility according to a set use condition. The integrated control agent 1280 may support mobility for home and foreign objects that satisfy a plurality of conditions. Here, the plurality of conditions may include at least two conditions selected from the group including an access node, a service quality, a network type, the type of a ubiquitous thing, the type of a support target (a thing, a user terminal, etc.), and a communication mode. The integrated control agent 1280 may be at least one of HA, FA, SIP Home Register, and SIP Foreign Register.

The above description provides seamless network services and content no matter where a terminal or a user is located by utilizing various wireless networks. Also, the above description provides a seamless network to various user devices or things to establish a stable system.

Also, the above-described mobility support method for the mobility support target may be implemented using a program (or an application) including an executable algorithm that may be executed by a computer or a server. The program may be stored and provided in a transitory or non-transitory computer-readable medium.

The non-transitory computer-readable medium refers to a medium that semi-permanently stores data and is readable by a device rather than a medium that temporarily stores data such as a register, a cache, and a memory. Specifically, the above-described various applications or programs may be stored and provided in a non-transitory computer-readable medium such as a compact disc (CD), a digital versatile disc (DVD), a hard disk, a Blu-ray disc, a Universal Serial Bus (USB), a memory card, a read-only memory (ROM), a programmable read only memory (PROM), an erasable PROM (EPROM), an electrically EPROM (EEPROM), or a flash memory.

A transitory computer-readable medium refers to various random-access memories (RAMs) such as a static RAM (SRAM), a dynamic RAM (DRAM), a synchronous DRAM (SDRAM), a double data rate SDRAM (DDR SDRAM), an enhanced SDRAM (ESDRAM), a SyncLink DRAM (SL-DRAM), and a Direct Rambus RAM (DRRAM).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of supporting wireless Internet mobility, the method comprising:
   receiving, by a mobility support server, at least one service condition selected from a service condition group consisting of network information, service quality information, ubiquitous thing information, communication mode information, and access node terminal information for a mobility support target;
   registering, by the mobility support server, the at least one service condition for the mobility support target;
   providing, by the mobility support server, an Internet service for the mobility support target on the basis of the at least one service condition; and
   supporting, by the mobility support server, mobility for the mobility support target on the basis of the at least one service condition when a cause of mobility for the mobility support target is occurred,
   wherein the mobility support target comprises at least one target selected from the target group consisting of a thing, a user terminal, and a user, and
   wherein the network information comprises at least one network type selected from a network type group consisting of an indoor wireless Internet network, an indoor wireless Internet of Things (IoT) network, an outdoor wireless Internet network, and an outdoor wireless IoT network.

2. The method of claim 1, further comprising
   broadcasting, by the mobility support server, at least one list selected from a list group consisting of a list of access node terminals, a list of service qualities, a list of ubiquitous things, a list of communication modes, or a list of networks before receiving the service condition; and
   receiving, by the mobility support server, the at least one service condition which is determined based on information from the at least one list.

3. The method of claim 1, further comprising, when the service condition comprises the access node terminal information:
   receiving, by the mobility support server, information on an access node terminal selected from a list of available access node terminals from the mobility support target; and
   approving use of the selected access node terminal and registering the access node terminal as a terminal for supporting mobility for the mobility support target, by the mobility support server,
   wherein the access node terminal supports handover or roaming mobility for the mobility support target through an accessible network.

4. The method of claim 1, further comprising, when the service condition comprises the network information:
   receiving, by the mobility support server, information on a network selected from a list of available networks from the mobility support target; and
   approving use of the selected network and registering the network as a network for supporting mobility for the mobility support target, by the mobility support server,
   wherein when a plurality of networks are selected, the mobility support server selects a network for supporting mobility among the plurality of networks on the basis of at least one of a priority set by the user, a location of the mobility support target, and a signal quality provided to the mobility support target.

5. The method of claim 1, further comprising, when the service condition comprises the service quality information:
   receiving, by the mobility support server, information on at least one of a service type or a service quality selected from among the list of service qualities from the mobility support target; and
   approving use of the selected at least one of the service type or the service quality and registering the selected service type or service quality as a service quality for supporting mobility for the mobility support target, by the mobility support server, wherein in the supporting of the mobility, the mobility support server supports mobility through a network, a ubiquitous thing, or an access node terminal capable of maintaining the selected at least one of the service type or the service quality.

6. The method of claim 1, further comprising, when the service condition comprises the ubiquitous thing information:
receiving, by the mobility support server, information on at least one ubiquitous thing selected from a list of ubiquitous things from the mobility support target; and
approving use of the at least one ubiquitous thing and registering the ubiquitous thing as a ubiquitous thing for supporting mobility for the mobility support target, by the mobility support server,
wherein the mobility support server supports the mobility for the mobility support target based on availability of the ubiquitous thing, and
wherein the ubiquitous thing has a certain computation power for the mobility support target.

7. The method of claim 1, further comprising, when the service condition comprises the communication mode information:
receiving, by the mobility support server, information on a communication mode selected from a list of available communication modes from the mobility support target; and
approving use of the selected communication mode and registering the communication mode as a communication mode for supporting mobility for the mobility support target, by the mobility support server,
wherein the communication mode supports handover or roaming mobility for the mobility support target through a network, a ubiquitous thing, or an access node terminal that supports the communication mode.

8. The method of claim 1, wherein
the at least one network type comprises an indoor wireless IoT network and an indoor wireless Internet network, and
in the supporting of the mobility,
when there is an available indoor wireless IoT network among preregistered indoor wireless IoT networks, the mobility support server supports mobility through the available indoor wireless IoT network, and
when there is no indoor wireless IoT network that is available or that satisfies a preset condition, the mobility support server supports mobility for the mobility support target through an available indoor wireless Internet network among preregistered indoor wireless Internet networks.

9. The method of claim 1, wherein
the at least one network type comprises an outdoor wireless IoT network and an outdoor wireless Internet network, and
in the supporting of the mobility,
when there is an available outdoor wireless IoT network among preregistered outdoor wireless IoT networks, the mobility support server supports mobility through the available outdoor wireless IoT network, and
when there is no outdoor wireless IoT network that is available or that satisfies a preset condition, the mobility support server supports mobility for the mobility support target through an available outdoor wireless Internet network among preregistered outdoor wireless Internet networks.

10. The method of claim 1, wherein
the at least one network type comprises an indoor wireless IoT network, an indoor wireless Internet network, an outdoor wireless IoT network, and an outdoor wireless Internet network, and
in the supporting of the mobility when a signal quality of an indoor wireless IoT network or an indoor wireless Internet network that is currently accessed by the mobility support target is lower than a reference value, the mobility support server checks whether there is at least one outdoor wireless IoT network or at least one outdoor wireless Internet network having a signal quality higher than or equal to the reference value and supports mobility for the mobility support target through one of the at least one outdoor wireless IoT network or the at least one outdoor wireless Internet network.

11. The method of claim 1, wherein the user terminal is a personal thing, a sensor, an IoT device, a smartphone, a wireless microphone, a wireless earphone, a wireless headset, a virtual reality device, an augmented reality device, a hologram output device, a voice recognition device, a gesture recognition device, or an input/output (I/O) device.

12. The method of claim 1, wherein the mobility support target distributes a computation process to at least one nearby ubiquitous thing to perform the computation process, and the ubiquitous thing is at least one selected from a computing device group consisting of a device having a computation processing function, a device included in the IoT, a gateway, a router, and the mobility support server.

13. A wireless Internet-based mobility support server comprising:
a storage device configured to store at least one list selected from a list group consisting of a list of available networks, a list of service qualities, a list of ubiquitous things, a list of communication modes, a list of access node terminals, and a list of mobility support targets;
a communication device configured to receive at least one service condition selected from a service condition consisting of including network information, service quality information, access node terminal information, ubiquitous thing information, communication mode information, and mobility support target information; and
a computing device configured to perform control to decide an available network or ubiquitous thing for the mobility support target according to the at least one service condition and provide a network service to the mobility support target through the decided network or ubiquitous thing when wireless network movement occurs after initial network access,
wherein the mobility support target comprises at least one target selected from a target consisting of including a thing, a user terminal, and a user, and
wherein the at least one service condition is selected based on information included in the at least one list.

14. The wireless Internet-based mobility support server of claim 13, wherein
the service condition comprises the access node terminal information, and
the computing device supports handover or roaming mobility for the mobility support target using a specific access node terminal selected from the access node terminal information included in the service condition on the basis of a location of the mobility support target.

15. The wireless Internet-based mobility support server of claim 13, wherein
- the service condition comprises the network information on a plurality of networks,
- the computing device selects one of the plurality of networks on the basis of at least one of a priority set by the mobility support target, a location of the mobility support target, and a signal quality received by the mobility support target, and the computing device supports mobility for the mobility support target, and
- the plurality of networks comprise homogeneous or heterogeneous networks.

16. The wireless Internet-based mobility support server of claim 13, wherein
- the service condition comprises the service quality information, and
- the computing device supports mobility through a network, a ubiquitous thing, or an access node terminal capable of maintaining a service quality indicated by the service quality information, and when it is not possible to maintain the selected service quality, the computing device supports mobility through another network, another ubiquitous thing, or another access node terminal on the basis of a service quality newly selected by the mobility support target.

17. The wireless Internet-based mobility support server of claim 13,
- wherein the service condition comprises the ubiquitous thing information,
- wherein the computing device supports the mobility for the mobility support target based on availability of the ubiquitous thing which is determined by the ubiquitous thing information, and
- wherein the ubiquitous thing has a certain computation power for the mobility support target.

18. The wireless Internet-based mobility support server of claim 13, wherein
- the service condition comprises the communication mode information, and
- the computing device supports handover or roaming mobility for the mobility support target using a network, a ubiquitous thing, or an access node terminal that supports a selected specific communication mode from the communication mode information included in the service condition on the basis of a location of the mobility support target.

19. The wireless Internet-based mobility support server of claim 13, wherein the mobility support target distributes a computation process to at least one nearby ubiquitous thing to perform the computation process, and the ubiquitous thing is at least one selected from a computing device consisting of including a device having a computation processing function, a device included in the IoT, a gateway, a router, and the mobility support server.

20. The wireless Internet-based mobility support server of claim 13, wherein
- the user terminal is a specific fixed or movable device placed in a specific area,
- the communication device receives the user's access or the user's location from the specific device, and
- the computing device provides a service to the specific device using a network corresponding to the service condition.

* * * * *